(12) United States Patent
Rowlands et al.

(10) Patent No.: US 6,460,149 B1
(45) Date of Patent: Oct. 1, 2002

(54) SUICIDE AMONG WELL-MANNERED CLUSTER NODES EXPERIENCING HEARTBEAT FAILURE

(75) Inventors: Mohan Babu Rowlands, Union City; Govindaraju Gnanasivam, Milpitas, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/547,000

(22) Filed: Apr. 11, 2000

Related U.S. Application Data

(63) Continuation of application No. 09/518,479, filed on Mar. 3, 2000.

(51) Int. Cl.[7] .............................................. G06F 11/00
(52) U.S. Cl. ........................................ 714/43; 711/114
(58) Field of Search ............................. 714/43, 47, 4, 714/5, 6, 7, 11, 20, 25, 114, 115, 42, 44; 709/201, 203; 370/241, 242; 711/114, 115, 133

(56) References Cited

U.S. PATENT DOCUMENTS

| | | | | |
|---|---|---|---|---|
| 5,093,824 A | * | 3/1992 | Coan et al. | 370/228 |
| 5,612,865 A | * | 3/1997 | Dasgupta | 364/184 |
| 5,805,785 A | * | 9/1998 | Dias et al. | 714/4 |
| 5,832,222 A | * | 11/1998 | Dziadosz et al. | 709/216 |
| 6,108,699 A | * | 8/2000 | Moiin | 709/22 N |
| 6,115,830 A | * | 9/2000 | Zabarsky et al. | 714/15 |
| 6,161,191 A | * | 12/2000 | Slaughter et al. | 714/4 |
| 6,163,855 A | * | 12/2000 | Shrivastava et al. | 714/4 |
| 6,178,529 B1 | * | 1/2001 | Short et al. | 714/51 |
| 6,192,401 B1 | * | 2/2001 | Modiri et al. | 709/220 |
| 6,192,483 B1 | * | 2/2001 | Moiin et al. | 714/4 |
| 6,243,825 B1 | * | 6/2001 | Gamache et al. | 714/4 |

OTHER PUBLICATIONS

"Microsoft Windows NT Server Cluster Strategy: High availability and Scalability with Industry–Standard Hardware". A White Paper from the Business systems Division.

"Concepts and Planning: Microsoft "Wolfpack" Clustering for Windows NT Server", Microsoft Corporation.

* cited by examiner

Primary Examiner—Nadeem Iqbal
(74) Attorney, Agent, or Firm—Dorsey & Whitney LLP; Larry Mendenhall

(57) ABSTRACT

Methods for re-configuring a cluster computer system of multiple or more nodes when the cluster experiences communications failure. First and second nodes of the cluster have respective channel controllers. A SCSI channel and the controllers communicatively connect the multiple nodes. When a node becomes aware of a possible communications failure, the node attempts to determine the authenticity the failure and responds according to the determined authenticity.

According to one method, a first node detects heartbeat node-to-node communications failure on the channel and then tests a physical drive on the channel. If the testing is successful, the node kills the other node. If the testing is unsuccessful, the first node commits suicide.

In one embodiment, the coupling includes multiple channels communicatively coupling the first and second nodes and the first node selecting one of the channels for node-to-node communications. In this environment, choosing a physical drive involves testing node-to-node communications on another of the channels if no physical drive is online on the channel (and terminating the re-configuring method). If a drive is available, the first node uses the first physical drive online on the channel for testing.

In another method, the second node initially detects communications failure and communicates that by attempting to negotiate wih the first node for a new configuration of the computer system. The first node tests a physical drive in response and negotiates with the second node if the testing was successful. If the testing was unsuccessful, the first node commits suicide.

24 Claims, 29 Drawing Sheets

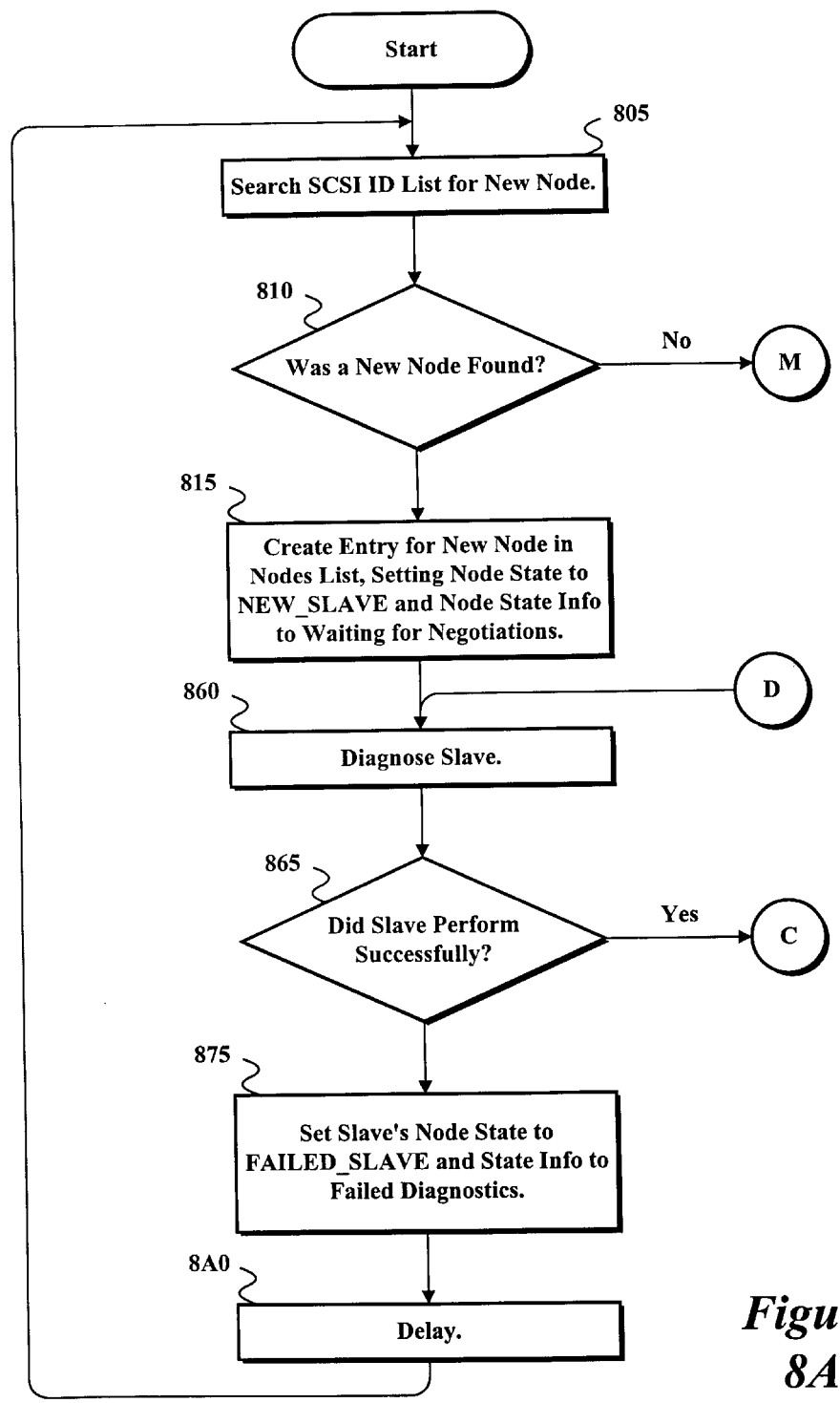
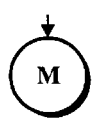
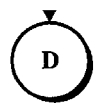
*Figure 8A*

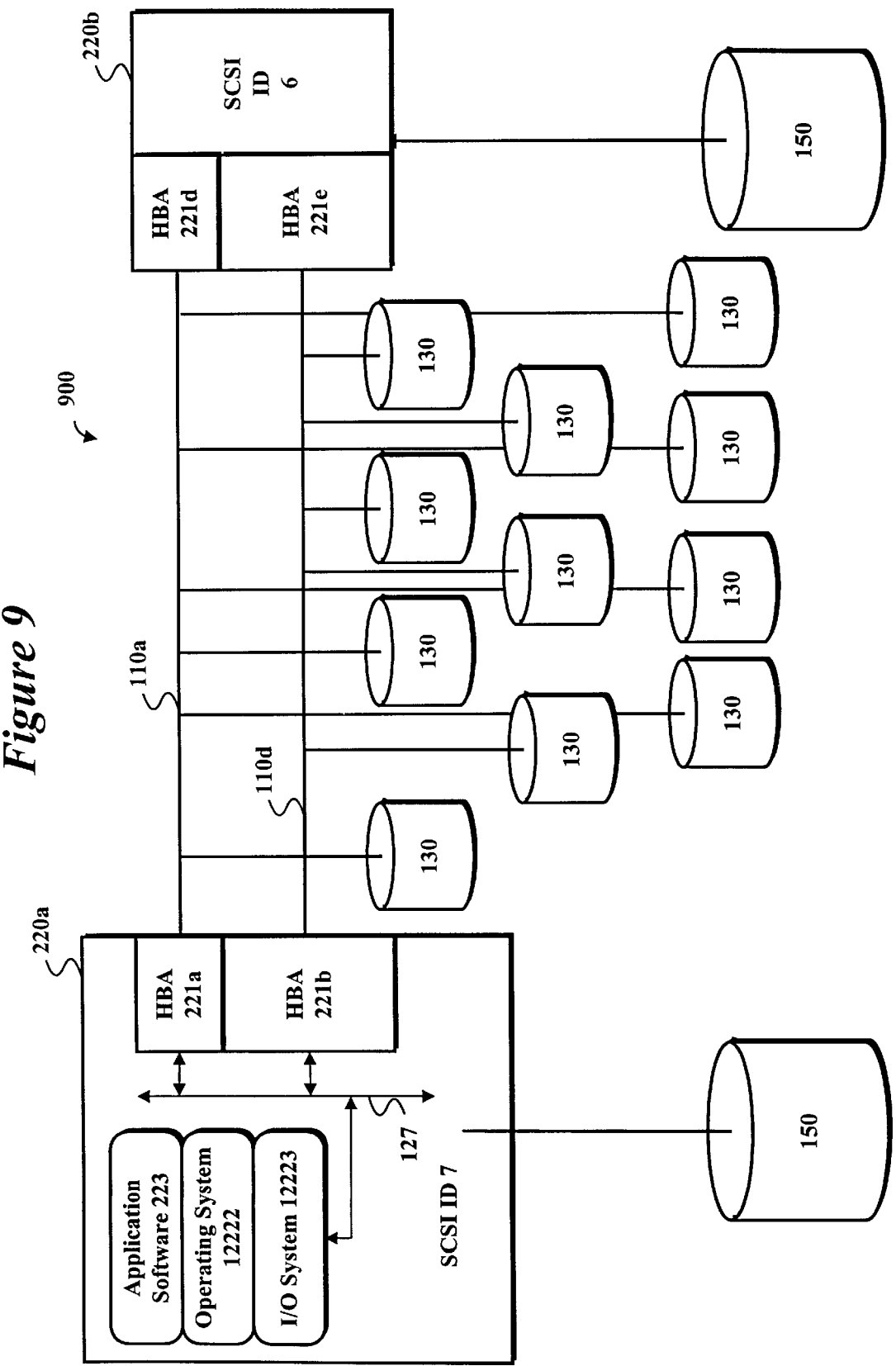

SUICIDE AMONG WELL-MANNERED CLUSTER NODES EXPERIENCING HEARTBEAT FAILURE

CROSS-REFERENCE TO RELATED APPLICATIONS

This application is a continuation of U.S. application Ser. No. 09/518,479, filed Mar. 3, 2000.

This application relates to:

U.S. patent application Ser. No. 09/518,551, entitled "Apparatus and Method for Implementing RAID Devices in a Cluster Computer System," filed Mar. 3, 2000, naming Govindaraju Gnanasivam and Krishnakumar R. Surugucchi as inventors, and commonly assigned to International Business Machines Corporation of Armonk, N.Y.

U.S. patent application Ser. No. 09/519,411, entitled, "Apparatus and Method for Rebuilding a Logical Device in a Cluster Computer System," filed Mar. 3, 2000, naming Govindaraju Gnanasivam and Nallakumar Meiyappan as inventors, and commonly assigned to International Business Machines Corporation of Armonk, N.Y., and U.S. patent application Ser. No. 09/518,498, entitled, "Apparatus and Method for Detecting the Reset of a Node in a Cluster Computer System," filed Mar. 3, 2000, naming Mohan B. Rowlands as inventor, and commonly assigned to International Business Machines Corporation of Armonk, N.Y.

BACKGROUND

This invention relates to cluster computer systems in general. More particularly, the invention relates to recovering from cable failure in cluster computer systems with RAID devices.

Historically, data-center operators running critical applications demanding high reliability have turned to mainframes, minicomputers and the like running complex fault-tolerant software on complex fault-tolerant hardware. In a different market niche of less critical and less demanding environments, the Microsoft Corp. Windows operating system has made significant inroads into business data centers, running on relatively inexpensive and uncomplicated personal-computer and server platforms. These Windows platforms were adequate for certain services—database and e-mail, for example.

However, databases and e-mail are becoming increasingly important in the average business. Indeed, in some businesses these functions have taken on a critical nature. Accordingly, data-center operators with now-critical database, e-mail and similar applications want to run them on systems with high reliability. They are unwilling, however, to pay the costs of mainframes, minicomputers and their fault-tolerant software. In response to market demand, Microsoft Corp. has modified its Windows operating system to address the issue of high reliability.

Specifically, Microsoft now offers a Cluster Service product. Venerable if not ancient in the art, a "cluster" can be loosely defined as a parallel or distributed system of interconnected whole computers (sometimes called "systems" but herein termed "nodes" for clarity). The user of a cluster system logically views and uses it as a single, unified computing resource or service.

Generally speaking, a cluster enables the sharing of a computing load over several nodes without the user or client needing to know that more than one constituent node is involved. If any hardware or software component in the cluster system fails, the user or client may notice degraded performance but does not lose access to the service. The cluster system disperses the load from the failed component to the remainder of the cluster system. Conversely, if the user or client notices the need for more of a given resource (for example, processing power), that resource is simply added to the running cluster system, and the performance of the cluster system as a whole improves.

Well known in the art and only generally described here, the Microsoft Cluster Service product is the collection of all cluster-activity-management software on each node of a Microsoft cluster system. The Cluster Service is more fully described in "Microsoft Windows NT Server Cluster Strategy: High Availability and Scalability with Industry-Standard Hardware," (Microsoft Corp., 1995) and "Concepts and Planning: Microsoft 'Wolfpack' Clustering for Windows NT Server" (Microsoft Corp., 19__). These two Microsoft clustering documents are attached hereto as Appendices A and B and are incorporated by reference as well.

A Microsoft cluster system uses the Small Computer Systems Interface (SCSI) bus with multiple initiators as the storage connection (although Microsoft envisions supporting the Fiber Channel in the future). Well known in the art, SCSI is an evolving standard directed toward the support of logical addressing of data blocks on data devices. Documents detailing the variations of SCSI over time (SCSI-1, SCSI-2 and SCSI-3, for example) are available from the American National Standards Institute (ANSI) of New York, N.Y. (www.ansi.org). SCSI-1, SCSI-2 and SCSI-3 are together referred to as "SCSI" herein.

FIG. 1 illustrates a two-node cluster system 100 implemented on a SCSI bus 110 according to the prior art. In FIG. 1, the cluster system 100 includes a first server node 120a and a second server node 120b. The server nodes 120a and 120b have respective SCSI identifiers (SCSI IDs) 7 and 6. The server nodes 120 connect to the SCSI bus 110 through respective host bus adapters (HBAs) 121.

A node 120 typically includes one or more of the following: a central processor unit ("CPU") 126, a memory 122, a user interface 123, a co-processor 124, ports 125, a communications interface 121 and an internal bus 127.

Of course, in an embedded system, some of these components may be missing, as is well understood in the art of embedded systems. In a distributed computing environment, some of these components may be on separate physical machines, as is well understood in the art of distributed computing.

The memory 122 typically includes high-speed, volatile random-access memory (RAM) 1221, as well as non-volatile memory such as read-only memory (ROM) 1223. Further, the memory 122 typically contains software 1222. The software 1222 is layered: Application software 12221 communicates with the operating system 12222, and the operating system 12222 communicates with the I/O subsystem 12223. The I/O subsystem 12223 communicates with the user interface 123, the co-processor 124 and the communications interface 121 by means of the communications bus 127.

The communications interface 121, in this embodiment, is a host bus adapter 121.

The communications bus 127 communicatively interconnects the CPU 126, memory 122, user interface 123, co-processor 124 and communications interface 121.

To the SCSI bus 110 are also connected SCSI devices 130. The devices 130a through 130c can be, for example, physical disks with SCSI IDs 0 through 2, respectively.

Local disks 150 connect to respective nodes 120 as necessary.

FIG. 20 illustrates the physical view of a second cluster system 2000 implemented on a SCSI bus 110 with an external RAID controller 2060, according to the prior art. As in the cluster system 100, the cluster system 2000 includes the first and second server nodes 120. The server nodes 120 have respective SCSI IDs 7 and 6 and connect to the SCSI bus 110 through respective HBAs 121. Each of the nodes 120 runs software 1222.

To the SCSI bus 110 is also connected the device 130a and a RAID controller 2060 with respective unique SCSI IDs. Additional SCSI devices 2061 attach to the RAID controller 2060 by means of a SCSI bus 2062. The devices 130, 2061 can be physical disks, for example.

Again, local disks 150 connect to respective nodes 120 as necessary.

FIG. 21 illustrates the logical view of the cluster system 2000 of FIG. 20. The device 130 and the RAID controller 2060 each appears to the host 120 as a single SCSI device. The RAID controller 2060 organizes the devices 2061 to appear to the host 120 as logical units (LUNs) 2063 of the SCSI device 2060.

FIG. 22 illustrates the physical view of a third cluster system 2200 with internal RAID controllers 2210 and multiple shared SCSI channels 110, according to the prior art. As in the previous systems, the cluster system 2200 includes the first and second server nodes 120 with respective SCSI IDs 7 and 6. The server nodes 120 connect to multiple SCSI buses 110 through respective RAID controllers 2210 and run the software 1222.

To each SCSI bus 110 is connected at least one device 2061, each device 2061 having a SCSI ID unique for the channel 110 to which it connects. The devices 2061 can be physical disks, for example. Local disks 150 again connect to respective nodes 120 as necessary.

FIG. 23 illustrates the logical view of the cluster system 2200 of FIG. 22. The RAID controllers 2210 organize the devices 2061 to appear to the host 120 as SCSI disks 130 on a single SCSI channel 110. The RAID controllers 2210 thus appear to the host 120 as HBAs 121.

In this sense, the RAID controllers 2060, 2210 hide the complexity of the RAID SCSI disks 2061 and the controllers 2060, 2210 themselves from the hosts 120.

The SCSI standard implements Reserve( ) and Release( ) commands. This pair of commands allows a SCSI initiator (for example, a node 120) to reserve a SCSI target or logical unit on a SCSI target and later to release it. In the prior art, the usual handling of one of these commands in a Microsoft Windows 95/98 cluster system 100, 2000, 2200 involves an HBA 121 passing the command to the target, which then executes it.

Where the SCSI target of a Reserve( ) command is a logical unit 2063 of an external RAID controller 2060 or where the SCSI target is a logical disk 130 depending from an internal RAID controller 2210, the controller 2060, 2210 still passes the Reserve( ) command to all of the disks 2061 that compose the target. This pass-through method, however, is patently inefficient, reserving more devices 2061 than the initiator 120 may require. The pass-through method also imposes limitations on a RAID configuration.

The implementation of a RAID device 2060 in a cluster environment presents another problem, this with respect to disk failure. In a non-cluster environment, rebuilding a logical device 2063, 130 in the face of failure is a well-practiced art: A controller restores data from a mirroring physical drive to a replacement physical drive. In a non-cluster environment, the logical choice of which node 120 is to rebuild the failed logical device 2063, 130 is the one and only node 120 holding the reservation to any of the physical units 2061.

In a cluster environment, however, multiple nodes 120 can hold a reservation to a physical unit 2061 through reservations to logical devices 2063, 130 comprising that unit 2061. Further, one node 120 can reserve a logical device 2063, 130 while a different node 120 receives the command to rebuild the logical device 2063, 130.

Accordingly, it is desirable to handle more efficiently and less restrictively the SCSI Reserve( ) and Release( ) commands in a cluster environment with RAID devices.

Also, in a cluster environment with RAID devices, it is desirable to rebuild a logical unit in a manner simple and localized to the affected nodes.

These and other goals of the invention will be readily apparent to one of skill in the art on reading the background above and the description below.

SUMMARY

Herein are described methods (and apparatus related to such methods) for re-configuring a cluster computer system of two or more nodes when the cluster experiences communications failure. First and second nodes of the cluster have respective channel controllers. A SCSI channel and the controllers communicatively connect the two nodes. When a node becomes aware of a possible communications failure, the node attempts to determine the authenticity of the failure and responds according to the determined authenticity.

According to one method addressing heartbeats between nodes, a first node detects node-to-node communications failure on the SCSI channel and then tests a physical drive on the channel. If the testing is successful, the node kills the other node. If the testing is unsuccessful, the first node commits suicide.

Detecting node-to-node communications failures involves the first node's setting a limit for the number of successive failures of node-to-node communications and attempting successive node-to-node communications the limited number of times, each of the attempts failing. Testing a physical drive includes determining whether any physical drive is online on the channel and setting a first physical drive online on the channel as the physical drive for testing.

In one embodiment, the coupling includes multiple channels communicatively coupling the first and second nodes, and the first node selecting one of the multiple channels for node-to-node communications. In this environment, the setting a first physical drive involves testing node-to-node communications on another of the multiple channels if no physical drive is online on the channel (and terminating the re-co-figuring method). If a physical drive is available, the first node sets the first physical drive online on the channel as the physical drive for testing.

In another method, the second node initially detects a node-to-node communications failure and communicates that detection by attempting to negotiate a new configuration of the computer system with the first node. The first node tests a physical drive in response and negotiates with the second node if the testing was successful. If the testing was unsuccessful, the first node commits suicide.

The testing includes checking each one of multiple channels until either (1) each channel passes the checking, in which case the first node negotiates in response to the negotiate command (and terminates the re-configuring method), or (2) one of the multiple channels fails the checking and has a physical drive online, in which case the first node sets a first physical drive online on the channel as the physical drive for testing.

BRIEF DESCRIPTION OF THE DRAWINGS

FIGS. 8A–8C compose a flowchart illustrating actions of the master node's monitor process.

FIG. 9 illustrates the logical view of the cluster system 200 of FIG. 2.

DESCRIPTION OF SPECIFIC EMBODIMENTS

TABLE OF CONTENTS

Overview
Data Structures
Methods, Processes and Protocols
   Firmware-Implemented SCSI Commands
   Node-to-Node Communications
   Node Startup
   The Monitor Process
   Configuration Changes
   Rebuild of a Logical Device
WHAT IS CLAIMED IS

Overview

Figure 1:
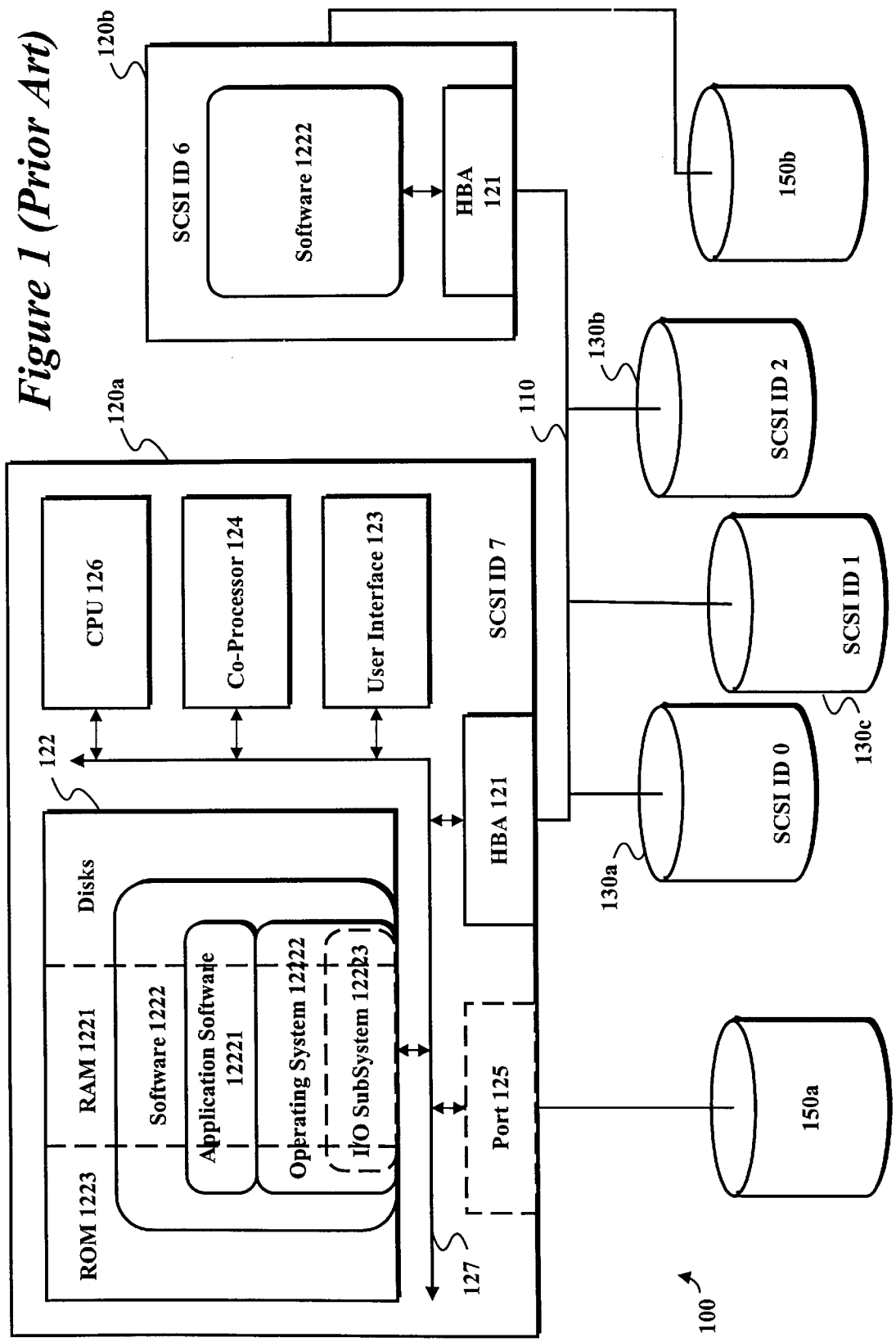
FIG. 1 illustrates a two-node cluster system implemented on a SCSI bus according to the prior art.
Figure 2:
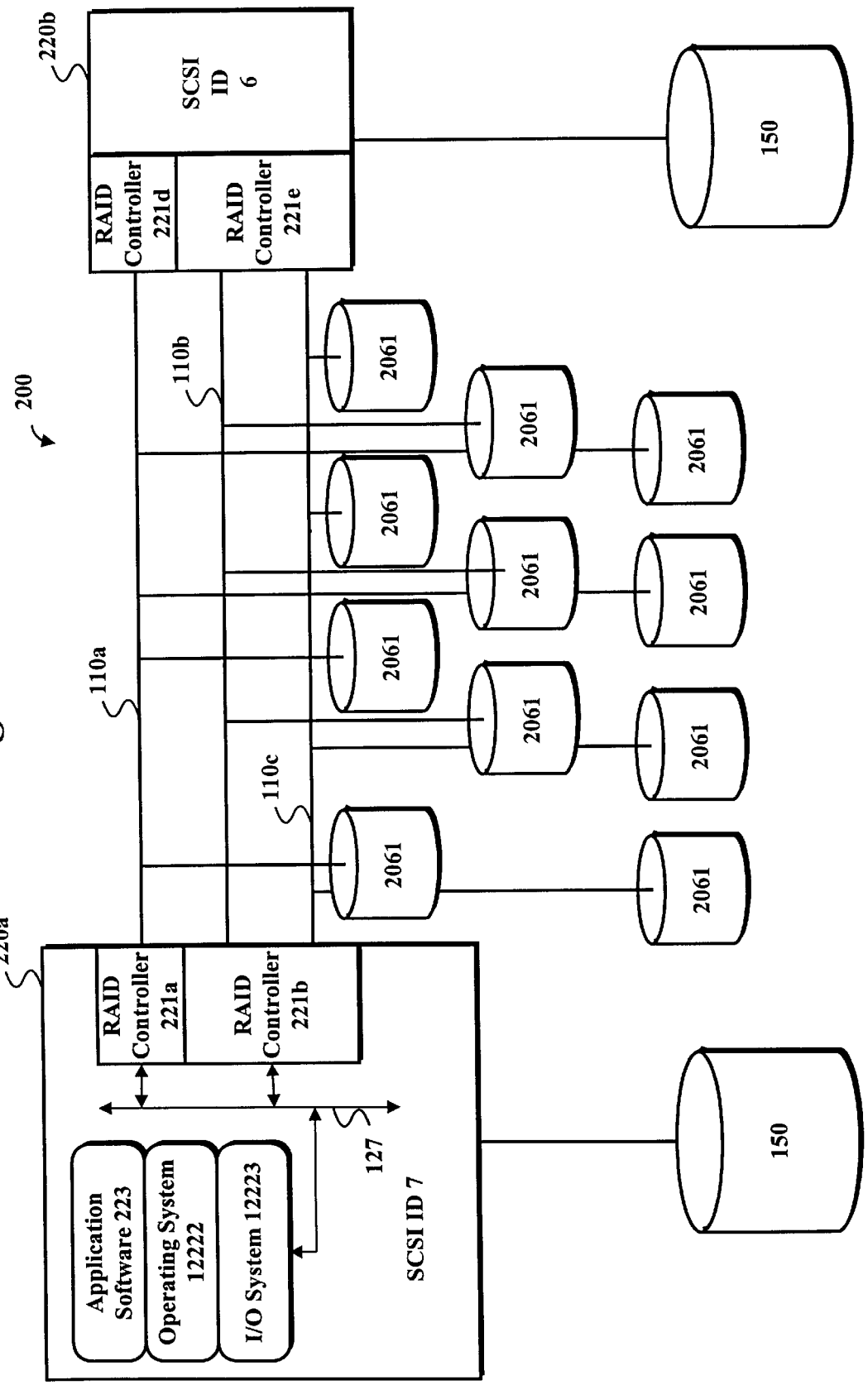
FIG. 2 illustrates the physical view of a two-node cluster computer system according to one embodiment of the invention.

FIG. 2 illustrates the physical view of a two-node cluster computer system 200 according to one embodiment of the invention. In FIG. 2, the computer system 200 includes nodes 220a and 220b. The server nodes 220 have respective SCSI identifiers (SCSI IDs) 7 and 6 (on all SCSI buses 110, though this need not be true). The server nodes 220 Connect to SCSI buses 110 through SCSI controllers 221. SCSI controllers 221 connected to the same SCSI bus 110 run compatible versions of software.

As with the nodes 120, a node 220 typically includes one or more of the following: a CPU (not shown), a memory (not shown), a user interface (not shown), a co-processor (not shown), a port (not shown), a communications interface 221 and an internal bus 127. (The composition of a node 220 may be altered according to the node's application in the arts of embedded systems and distributed computing.)

The memory typically includes RAM (not shown), as well as non-volatile memory (also not shown). Further, the memory typically contains layered software: Application software 223 communicates with the operating system 12222, and the operating system 12222 includes an I/O subsystem 12223. The I/O subsystem 12223 communicates with the user interface, the co-processor, the ports and the communications interfaces 221 by means of the communications bus 127.

A communications interface 221, in this embodiment, may be a RAID controller 221.

The communications bus 127 communicatively interconnects the CPU, memory, user interface, co-processor, port and communications interfaces 221.

To each SCSI bus 110 is connected at least one device 2061, each device 2061 having a SCSI ID unique for the channel 110 to which it connects. Local disks 150 connect to respective nodes 220 as necessary.

FIG. 9 illustrates the logical view of the cluster system 200 of FIG. 2. The RAID controllers 221 organize the devices 2061 to appear to the hosts 220 as SCSI disks 130 on SCSI channels 110. The RAID controllers 221 thus appear to the host 120 as HBAs 221.

The computer system 200 is a shared-nothing system. That is to say, while more than one node 220 in the system 200 may have access to a device, one and only one node 220 owns and manages that device at any given time.

Figure 3:
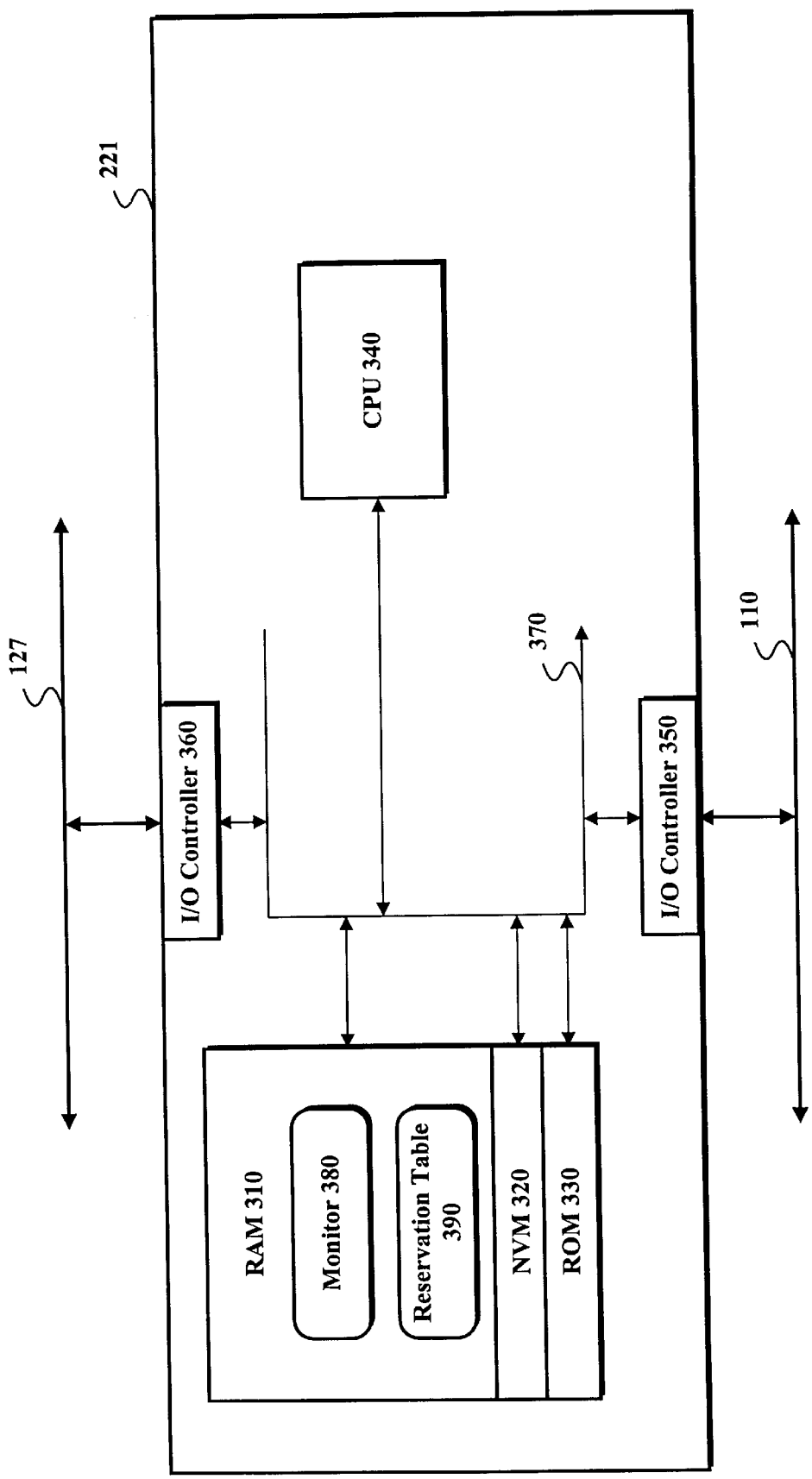
FIG. 3 illustrates a controller for a node of a cluster system according to the invention.

FIG. 3 illustrates a controller 221 for a node 220 of a cluster system 200 according to the invention. A controller 221 includes a CPU 340, random access memory (RAM)

310, non-volatile memory (NVM, typically NVRAM) 320, read-only memory (ROM) 330 and I/O controllers 350 and 360. Each of the controller components 310 through 360 communicates using the internal bus 370. The I/O controller 360 communicatively connects the controller 221 to the node internal bus 127, while the I/O controller 350 communicatively connects the controller 221 to the SCSI bus 110.

In various embodiments, the RAM 310 includes a reservation table 390 and possibly a monitor process 380 (both described below).

Reservation of a logical device 130 is done by the cooperating controllers 221. On the operating system 12222's requesting the reservation of a logical device 130, the driver for the logical device 130 issues a command to the (software of) the controller 221. The controller 221 handles the reservation as per SCSI specifications.

In handling the reservation at the controller level, a controller 221 communicates reservation information to any other controllers 221, communicating via the back-end SCSI bus(es) 110. On successful communications, the reserving controller 221 completes the command to the operating system 12222.

The system 200 implements the Release( ) command at the level of the controllers 221 as well. The controller 221 receiving the Release( ) command communicates to any other controllers 221 before completing the command to the operating system 12222.

Data Structures

A first data structure is a list of channels connecting one particular node controller 221 to other node controllers 221. The instant implementation of the list is as a bit map. (The pseudo-code Used herein tends to follow the grammar of the C and C++ languages.):

int Connected_Channels;

A second data structure is a node 220's SCSI ID, Node_ID. Such a data structure is familiar to a routine practioner of the SCSI art. As the described embodiment is a SCSI-2 implementation, a Node_ID can be represented as an 8-bit character:

char Node_ID;

A third data structure is a list of SCSI IDs for the nodes 220. The list is here implemented as an array Node_IDs:

char Node_IDs[];

A next data structure, Node, encompasses a node 220's SCSI ID and its state:

```
struct Node {   char Node_ID;
                char Node_State;
                char Node_State_Info;
                struct Node *Next_Node;
              };
```

The values of the Node_State field include: MASTER, NEW_SLAVE, DIAGNOSED_SLAVE, RESTARTED_SLAVE, FAILED_SLAVE, NEXUS_SLAVE, ACTIVE_SLAVE and KILLED_SLAVE.

The MASTER state indicates that the controller 221 of the node 220 is the master of the cluster system 200.

The NEW_SLAVE state indicates that the master node controller 221 has recently recognized a node controller 221 other than itself.

The DIAGNOSED_SLAVE state indicates that diagnostics that the master node controller 221 performed on a slave node controller 221 completed successfully.

The FAILED_SLAVE state indicates that the diagnostics performed on the slave node controller 221 did not complete successfully.

The RESTARTED_SLAVE state indicates that the master node controller 221 has directed a slave node controller 221 to reconfigure itself and restart.

On successful completion of negotiations, the state of a slave node controller 221 is NEXUS_SLAVE.

The state ACTIVE_SLAVE indicates that a slave node controller 221 has started up successfully and is awaiting negotiations with the master node controller 221.

The KILLED_SLAVE state indicates that a slave node controller 221 timed out on negotiations, could not update its configuration or has been expressly killed by a node controller 221.

The Node_State_Info field gives additional information about the state of a node controller 221. The values of the Node_State_Info field include: Starting_Up, Waiting_For_Negotiations, Negotiating, Failed_Diagnostics, Timed_Out_On_Negotiations, Changing_Configuration, Failed_Communications_Test, Completed_Startup and Rebuilding.

"Starting_Up" indicates that a node controller 221 is starting up.

"Waiting For_Negotiations" indicates that a slave node controller 221 is awaiting a Node_Negotiate( ) command from the master node controller 221.

"Negotiating" indicates that a slave node controller 221 is just about to start or is now negotiating its configuration with the master node controller 221.

"Failed_Diagnostics" indicates that a slave node controller 221 failed a diagnostic.

"Timed Out_On_Negotiations" indicates that a slave node controller 221 timed out waiting for the master node controller 221 to send it a Node Negotiate( ) command.

"Changing_Configuration" indicates that a slave node controller 221 is changing its configuration and restarting.

"Failed_Communications_Test" indicates that a slave node controller 221 has failed a test of communications between the master node controller 221 and the slave node controller 221.

"Completed_Startup" indicates that a node controller 221 has completed its startup process.

"Rebuilding" indicates that a node controller 221 is aware of a rebuild in progress in the cluster system 200.

A next data structure is a list of nodes 220 and their respective states. In one embodiment, this list is a linked list, Nodes, of nodes 220:

struct Node *Nodes

A next data structure is a reservation table 390. A reservation table 390 cross-references logical devices (logical disks 130, in the cluster system 900) with a reserving SCSI device, if any (hosts 220, in the cluster system 900). Table 1 illustrates one embodiment of a reservation table 390.

In Table 1, the node controller 221 with SCSI ID 7 has reserved the logical disk 130 with ID 4. The node controller 221 with SCSI ID 6 has reserved the logical disk 130 with ID 0.

A next data structure is the SCSI-specified 10-byte vendor-specific command with opcode 20h. Table 2 describes the SCSI format of the 20h command. As with any SCSI command, the first byte (byte 0) is an opcode and the last byte (here, byte 9) is a control byte. The remaining fields of a 20h-opcode command are vendor specific.

An embodiment of this invention uses the 10-byte 20h-opcode vendor-specific command to effect communications between nodes 220. More particularly, the invention uses the 20h-opcode vendor-specific command to create commands issued, recognized and executed by cooperating controllers 221 to:

- check channel connections between two nodes 220 in a cluster system 200 (Node_Cable_Check( );
- read data from another node controller 221 in a cluster system 200 (Node_Read( ):
- write data to another node controller 221 in a cluster system 200 (Node_Write( ));
- update configuration information in another node controller 221 in a cluster system 200 (Node_Negotiate( ));
- force a node controller 221 into a suspension mode (Node_Kill( ));
- update the reservation tables 390 of other nodes 220 in a cluster system 200 while reserving a logical device (Node_Reserve( ));
- remove a logical-device reservation from other nodes 220 in a cluster system 200 (Node_Release( ));
- inform another controller 221 in a cluster system 200 of the receipt of a command to rebuild a logical device 130 (Node_Inform_Rebuild_Received( );
- inform a master node controller 221 in a cluster system 200 of the specifics of a command to rebuild a logical device 130 (Node_Inform_Master_Rebuild_Received( );
- instruct a node controller 221 in a cluster system 200 to start a rebuild of a logical device 130 (Node_Rebuild( );
- inform a master node controller 221 in a cluster system 200 that a slave node controller 221 has responsively started a rebuild of a logical device 130 (Node_Inform_Rebuild_Started( ));
- periodically inform a node controller 221 in a cluster system 200 of the progress of a rebuild (Node_Inform_Status( );
- inform a node controller 221 in a cluster system 200 of the completion of a rebuild of a logical device 130 (Node_Inform_Rebuild_Completed( ); and
- inform a slave node controller 221 that a rebuild of all logical devices 130 associated with a new drive is complete (Node_Inform_Rebuilt_All( )).

Each of these commands is described in turn below.

Table 3 describes the format of the Node_Cable_Check( ) command. Byte 0 is the opcode, and byte 9 is the control byte. The three most significant bits of byte 1 specify the logical unit number (LUN), and the remaining bits of byte 1 are unused (here, reserved). Byte 2 specifies that the command is Node_Cable_Check( ). The remaining by test are unused.

Table 4 describes the format of the Node_Read( ) command. Byte 0 is the opcode, and byte 9 is the control byte. The three most significant bits of byte 1 specify the LUN, and the remaining bits of Byte 1 are unused. Byte 2 specifies that the command is Node_Read( ). Byte 3–6 specify the starting address, with bit 0 of byte 3 as the LSB and bit 7 of byte 6 as the MSB. Bytes 7 and 8 are respectively the LSB and MSB of the number of bytes to read.

Table 5 describes the format of the Node_Write( ) command. Byte 0 is the opcode, and byte 9 is the control byte. The three most significant bits of byte 1 specify the LUN, and the remaining bits of Byte 1 are unused. Byte 2 specifies that the command is Node_Write( ). Byte 3–6 specify the starting address, with bit 0 of byte 3 as the LSB and bit 7 of byte 6 as the MSB. Bytes 7 and 8 are respectively the LSB and MSB of the number of bytes to read.

Table 6 describes the format of the Node_Negotiate( ) command. Byte 0 is the opcode, and byte 9 is the control byte. The three most significant bits of byte 1 specify the LUN, and the remaining bits of byte 1 are unused. Byte 2 specifies that the command is Node_Negotiate( ). Byte 3–8 are unused.

Table 7 describes the format of the Node_Kill( ) command. Byte 0 is the opcode, and byte 9 is the control byte. The three most significant bits of byte 1 specify the LUN, and the remaining bits of byte 1 are unused. Byte 2 specifies that the command is Node_Kill( ). Byte 3–8 are unused.

Table 8 describes the format of the Node_Reserve( ) command. Byte 0 is the opcode, and byte 9 is the control byte. The three most significant bits of byte 1 specify the LUN, and the remaining bits of byte 1 are unused. Byte 2 specifies that the command is Node_Reserve( ). Byte 3–8 are unused.

Table 9 describes the format of the Node_Release( ) command. Byte 0 is the opcode, and byte 9 is the control byte. The three most significant bits of byte 1 specify the LUN, and the remaining bits of byte 1 are unused. Byte 2 specifies that the command is Node_Release( ). Byte 3–8 are unused.

Table 10 describes the format of the Node_Inform_Rebuild_Received( ) command. Byte 0 is the opcode, and byte 9 is the control byte. The three most significant bits of byte 1 specify the LUN, and the remaining bits of byte 1 are unused. Byte 2 specifies that the command is Node_Inform_Rebuild_Received( ). Byte 3–8 are unused.

Table 11 describes the format of the Node_Inform_Master_Rebuild_Received( ) command. Byte 0 is the opcode, and byte 9 is the control byte. The three most significant bits of byte 1 specify the LUN, and the remaining bits of byte 1 are unused. Byte 2 specifies that the command is Node_Inform_Master_Rebuild_Received( ). Bytes 3–8 are unused.

Table 12 describes the format of the Node_Rebuild( ) command. Byte 0 is the opcode, and byte 9 is the control byte. The three most significant bits of byte 1 specify the LUN, and the remaining bits of byte 1 are unused. Byte 2 specifies that the command is Node Rebuild( ). Byte 3–8 are unused.

Table 13 describes the format of the Node_Inform_Rebuild_Started( ) command. Byte 0 is the opcode, and byte 9 is the control byte. The three most significant bits of byte 1 specify the LUN, and the remaining bits of byte 1 are unused. Byte 2 specifies that the command is Node_Inform_Rebuild_Started( ). Byte 3–8 are unused.

Table 14 describes the format of the Node_Inform_Status( ) command. Byte 0 is the opcode, and byte 9 is the control byte. The three most significant bits of byte 1 specify the LUN, and the remaining bits of byte 1 are unused. Byte 2 specifies that the command is Node_Inform_Status( ). Byte 3–8 are unused.

Table 15 describes the format of the Node_Inform_Rebuild_Completed( ) command. Byte 0 is the opcode, and byte 9 is the control byte. The three most significant bits of byte 1 specify the LUN, and the remaining bits of byte 1 are unused. Byte 2 specifies that the command is Node_Inform_Rebuild_Completed( ). Byte 3–8 are unused.

Table 16 describes the format of the Node_Inform_Rebuilt_All( ) command. Byte 0 is the opcode, and byte 9 is the control byte. The three most significant bits of byte 1 specify the LUN, and the remaining bits of byte 1 are unused. Byte 2 specifies that the command is Node_Inform_Rebuilt_All( ). Byte 3–8 are unused.

Table 17 describes the format of a Heartbeat( ) command, in one embodiment the SCSI six-byte Test Unit Ready( )

command. Byte 0 is the opcode, and byte 5 is the control byte. The three most significant bits of byte 1 specify the LUN, and the remaining bits of byte 1 are unused. Bytes 2–4 are unused.

A next data structure is the SCSI Inquiry( ) command with opcode 12h, described in Table 17. Byte 0 is the opcode, and byte 5 is the control byte. The three most significant bits of byte 1 specify the LUN, the least significant bit is the Enable Vital Product Data bit, and the second-least significant bit is the Command Support Data bit. The remaining bits of byte 1 are unused. Byte 2 specifies the page code/opcode. Byte 3 is unused. Byte 4 specifies the data length.

A next data structure is the standard SCSI Inquiry( ) data format, described in Table 19. As the standard Inquiry( ) data contains numerous fields, only a subset of which is of interest here, only that subset is described herein. The three most significant bits of byte 0 are the peripheral qualifier, and the remaining bits of byte 0 are the peripheral device type. The two most significant bits of byte 2 and the next three most significant bits of byte 2 indicate whether the device supports the ISO IS-9316 or the ECMA-111 version of the SCSI standard. The four least significant bits of byte 3 indicate the format of the data following. Byte 4 specifies how many additional bytes of information follow. Bytes 8–15 indicate the manufacturer's name in ASCII. Bytes 16–31 specify the product's name in ASCII. Bytes 32–35 specify the product's version number in ASCII. Bytes 36–55 are vendor specific.

A next data structure is a mailbox as follows:

```
struct mailbox{
    struct SYS_DRIVES logical_drives;
    /*  MAX_No_CHANNELS is the maximum number of channels
        possibly attached to a node.
        MAX_No_TARGETS is the maximum number of targets
        possible on a given channel.   */
    struct P_D_E physical _drives [MAX_No_CHANNELS]
                                  [MAX_No_TARGETS];
    struct CONFIG configuration;
    .
    .
    .
};
```

The logical_drives member of the mailbox data structure reflects the state of any logical drives in the system 200. Likewise, the physical_drives data structure reflects the state of the physical drives in the system 200.

These data structures and their use are explained further below.

Methods, Processes and Protocols
Firmware-Implemented SCSI Commands

In supporting the logical devices (130, in the cluster system 900) the controllers 221 implement the following commands in firmware: Reserve( ), Release( ), Reset_Device( ), Test_Unit_Ready( ), Inquiry( ), Read_Capacity( ), Read_FUA_DPO( ) and Write_FUA_DPO( ). All of the above commands are well known in the SCSI art, save for the Read_and Write_FUA_DPO( ) commands. ("FUA" is "force unit access." "DPO" is "disable page out." Both terms are well known in the SCSI art.) These commands may be implemented in the 60h-7Fh SCSI reserved command group.

Reservation of a logical device 130 is done by the controllers 221. On the operating system 12222's requesting the reservation of a logical device 130, the driver for the logical device 130 issues a DCMD command to the (software of) the controller 221. The controller 221 handles the reservation as per SCSI specifications.

In handling the reservation at the controller 221 level, a controller 221a communicates reservation information to any other controllers 221. The controllers communicate via the back-end SCSI bus(es) 110. On successful communications, the reserving controller 221 completes the command to the operating system 12222.

The system 200 implements the Release( ) command at the level of the controllers 221 as well. The controller 221 receiving the Release( ) command communicates to any other controllers 221 before completing the command to the operating system 12222.

The new Read_and Write_FUA_DPO( ) commands are the SCSI ten-byte Read( ) and Write( ) commands with the DPO and FUA bits. In one embodiment, the support for the DPO involves doing nothing: The controllers 221 support only write throughs. Reads with the FUA bit set are treated as cache misses.

Node-to-Node Communications

The nodes 220 in the cluster system 200 communicate via the back-end SCSI bus(es) 110. A node controller 221 uses for node-to-node communications any channel 110 that the Connected_Channels bit map notes as connected and available. The channel 110 that a node controller 221 is currently using is herein termed the "node-communications channel."

Figure 11A:
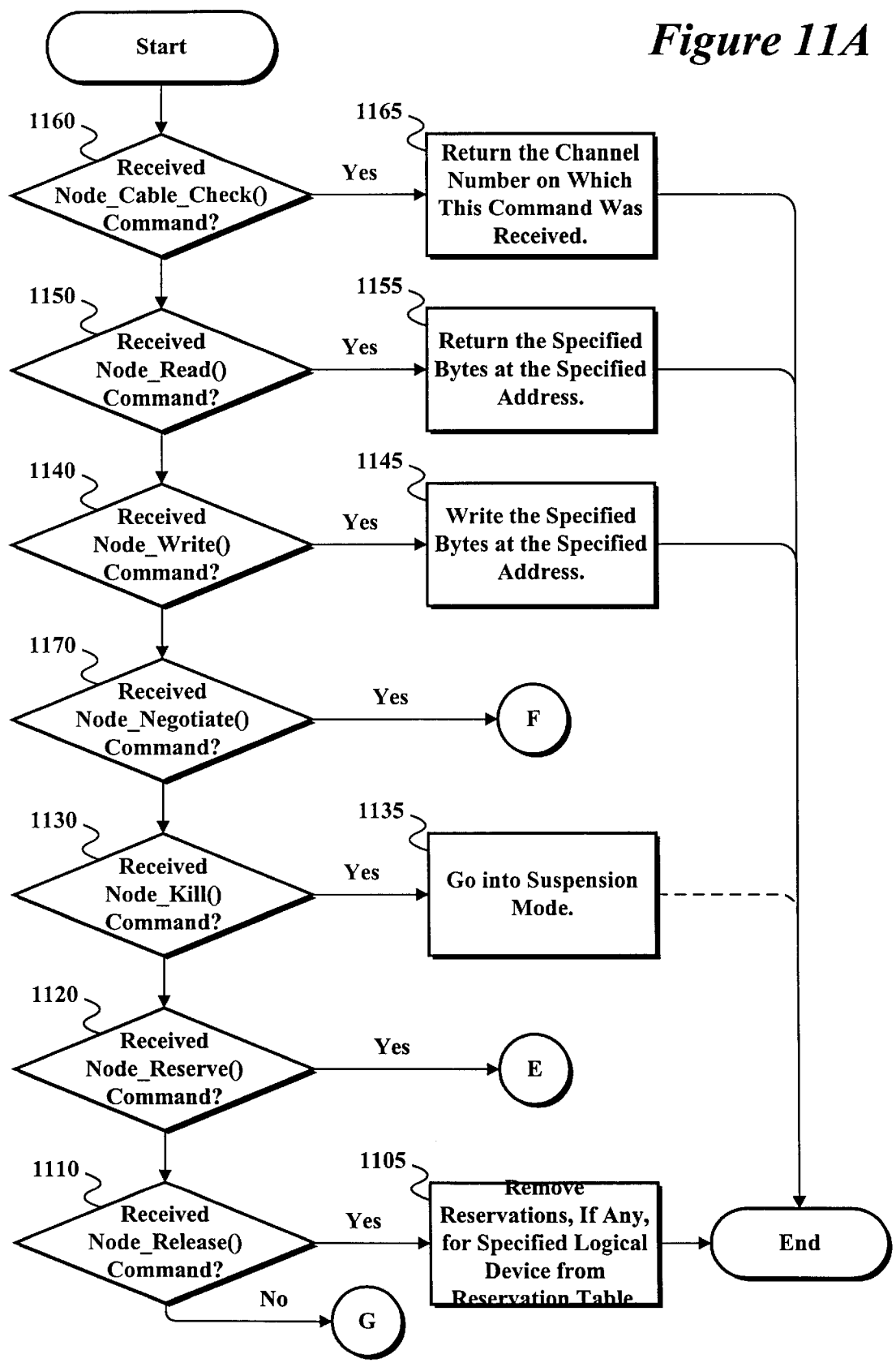
FIGS. 11A–11C compose a flowchart illustrating flow of control in a node processing SCSI bus communications.
Figure 11B:
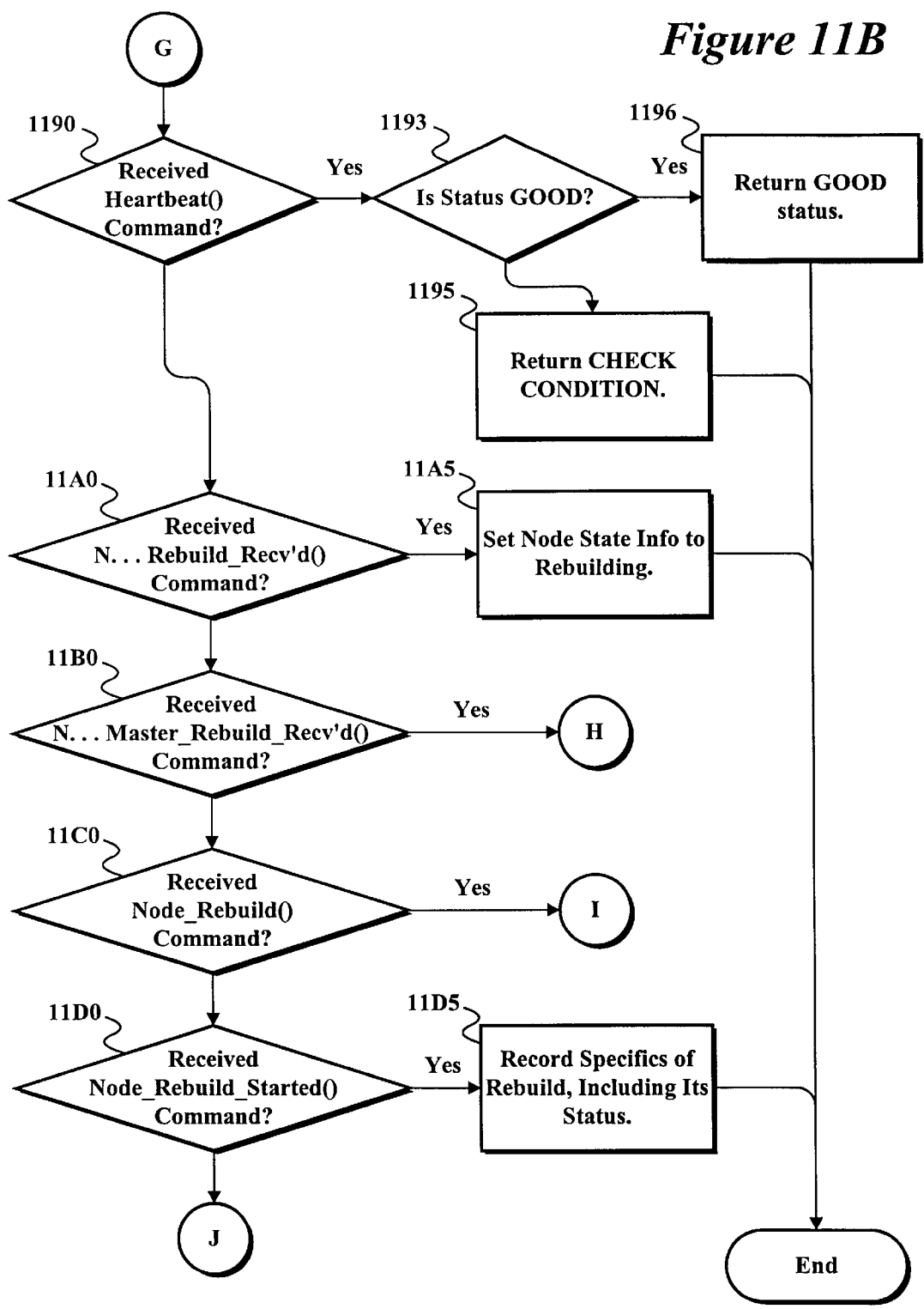
Figure 11C:
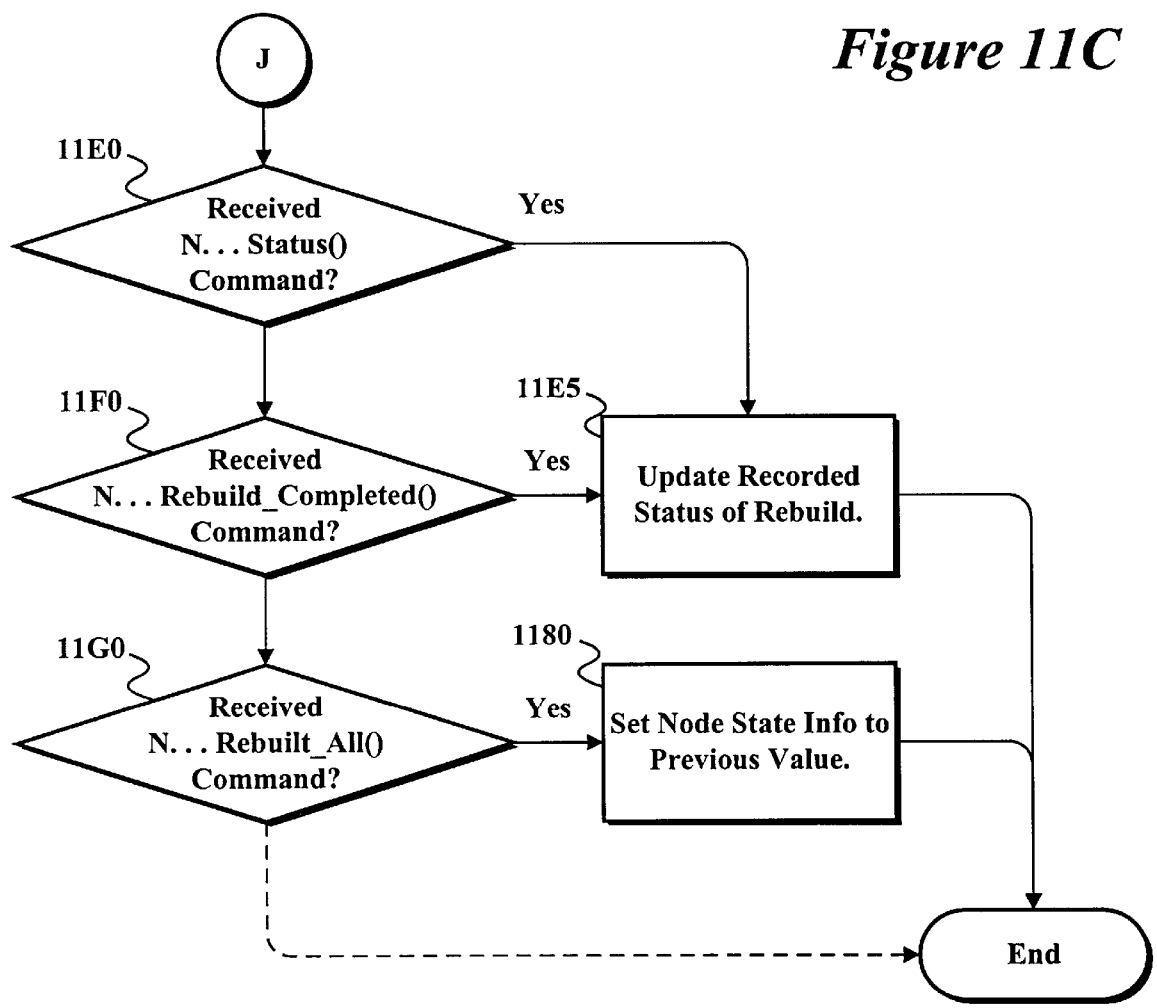

FIGS. 11A–11C compose a flowchart illustrating flow of control in a node controller 221 processing SCSI bus communications: When a node controller 221 receives the Node_Cable_Check( ) command, step 1160, the node controller 221 returns the channel number on which it received the command, step 1165.

When a node controller 221 receives the Node_Read( ) command, step 1150, the node controller 221 returns the specified count of bytes, starting at the physical address specified, step 1155.

When a node controller 221 receives the Node_Write( ) command, step 1140, the node controller 221 writes the specified count of bytes, starting at the specified physical address, step 1145.

A Node_Write( ) command may send a completion status only after the data is written to the media. The Node_Read( ) and Node_Write( ) commands support the disable-page-output (DPO) and force-unit-access (FUA) bits of the SCSI specification.

Figure 13:
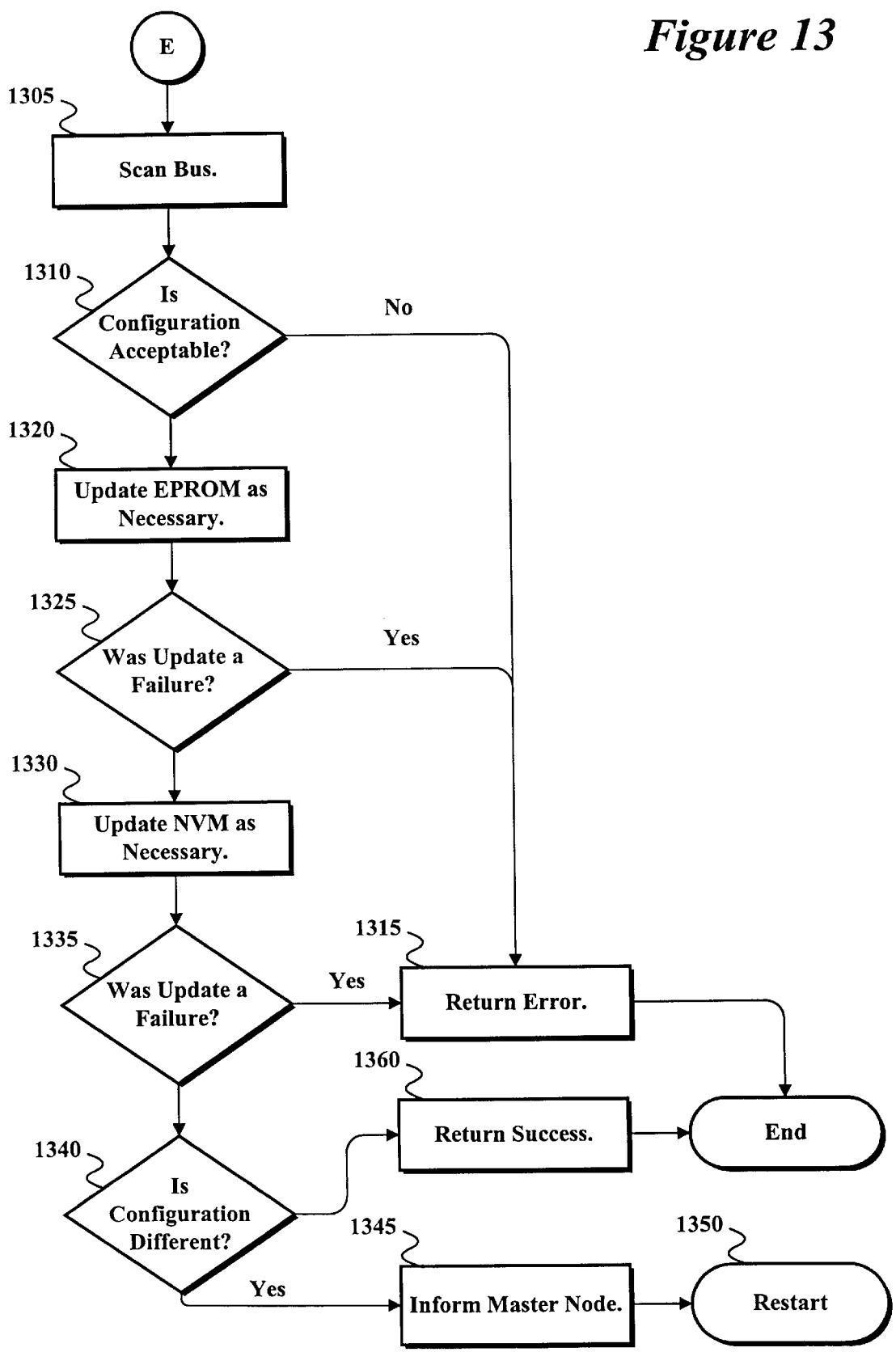
FIG. 13 is a flowchart illustrating flow of control in a node processing a Node_Negotiate( ) command.

FIG. 13 is a flowchart illustrating the flow of control in a node 220 processing a Node_Negotiate( ) command. When a node controller 221 receives the Node_Negotiate( ) command, step 1170, the node controller 221 scans the bus 110, step 1305, to determine whether the specified configuration is acceptable, step 1310. If not, the node controller 221 returns a configuration-mismatch error, step 1315. If an update to EEPROM fails, steps 1320 and 1325, the node controller 221 returns an EEPROM-write-failure error, step 1315. If an update to NVM fails, steps 1330 and 1335, the node controller 221 returns a NVM-write-failure error, step 1315.

If no configuration mismatch occurs, step 1310, if the writes to EEPROM and NVM succeed, steps 1320 through 1335, and if the accepted configuration differs from that the node controller 221 had earlier, step 1340, the node controller 221 informs the master node controller 221, step 1345, and restarts itself, step 1350.

In one embodiment, the mailbox data structure is the format for the data exchanged.

When a node controller 221 receives the Node_Kill( ) command, step 1130, the node controller 221 goes into a suspension mode, step 1135. (In suspension mode, a controller 221 awaits human intervention to correct an anamolous situation.)

Figure 10:
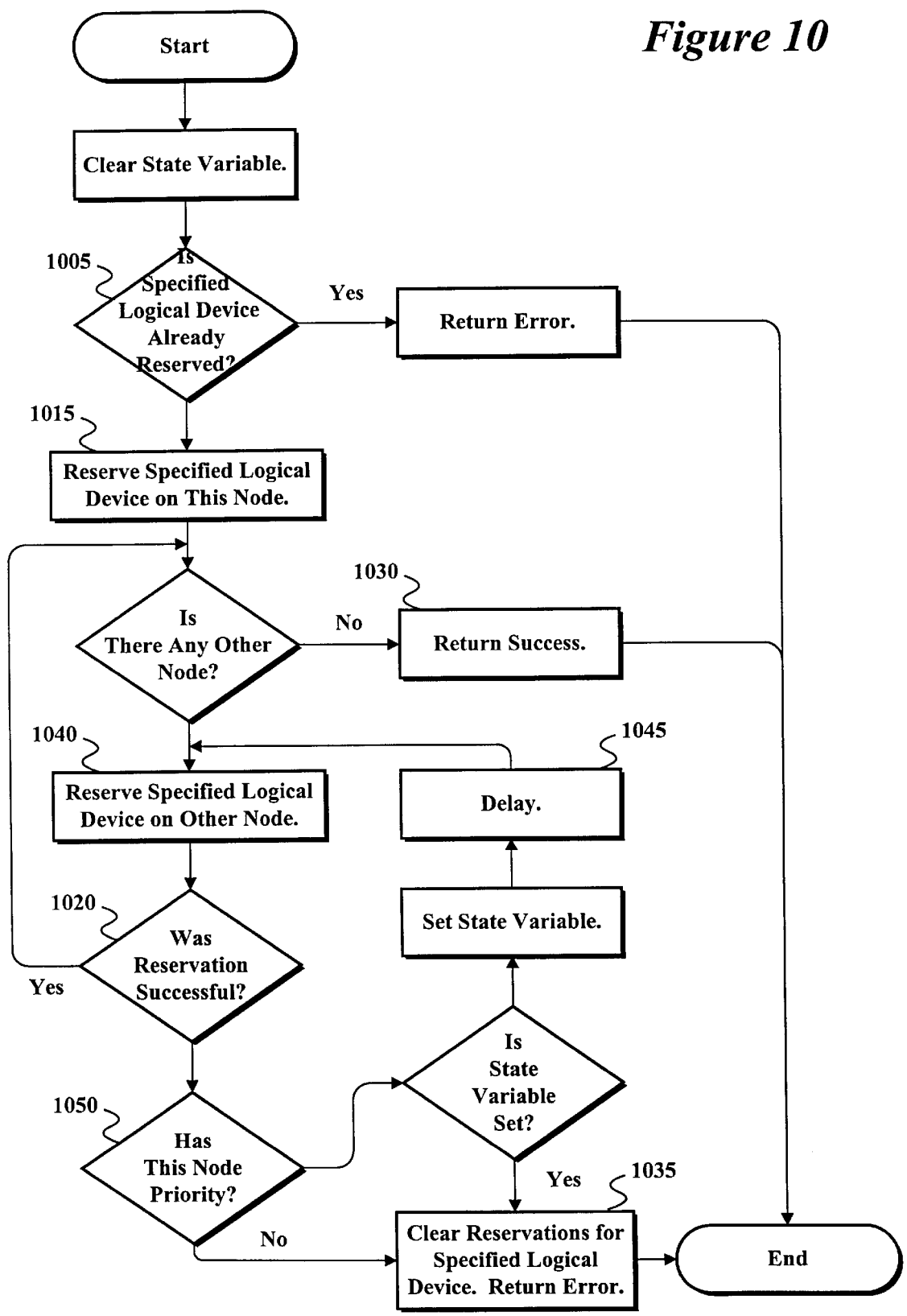
FIG. 10 is a flowchart illustrating flow of control in a node processing a SCSI Reserve( ) command.
Figure 12:
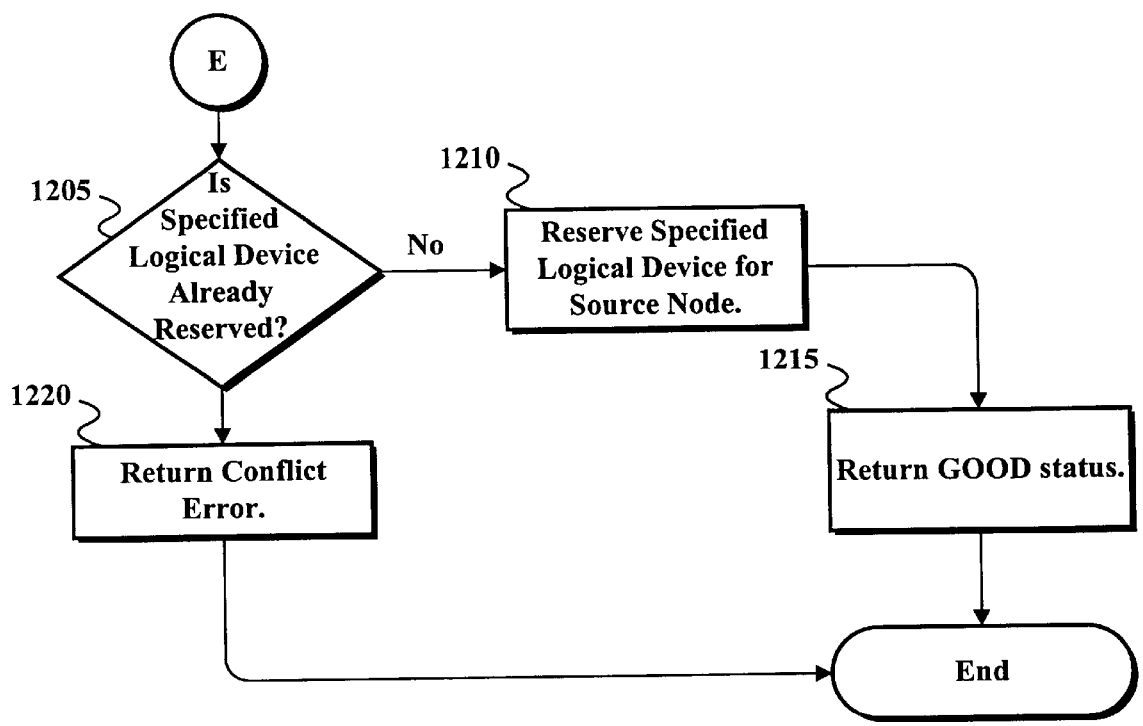
FIG. 12 is a flowchart illustrating flow of control in a node processing a Node_Reserve( ) command.

FIG. 10 is a flowchart illustrating the flow of control in a ode processing a SCSI Reserve( ) command. FIG. 12 is a flowchart illustrating the flow of control in a node 220 processing a Node_Reserve( ) command.

When a node controller 221 receives the Node_Reserve( ) command, step 1120, the node controller 221 checks its reservation table 390 to see whether the specified logical device has already been reserved, step 1205. If no entry is found for the specified logical device, the node controller 221 makes the reservation for the node 220 sending the command, step 1210, and returns with GOOD status, step 1215.

If, however, an entry exists, step 1205, the command terminates, returning a reservation-conflict error, step 1220.

When a controller 221 receives a SCSI Reserve( ) command, it checks its reservation table 390 to determine whether some node controller 221 has already reserved the logical device specified in the command, step 1005. If the specified logical device is not already reserved, the controller 221 make a reservation entry, step 1015. The controller 221 then issues a Node_Reserve( ) command(s) to the other node(s) 220 in the cluster system 200 to reserve the specified logical device, step 1040. In so doing, the controller 221 determines whether any other node controller 221 has reserved the specified logical device (in the other node controller 221's reservation table 390), step 1020. If no node controller 221 has previously reserved the specified logical device, step 1205, the other node controller 221 reserves the specified logical device on behalf of the controller 221, step 1210, and the controller 221 successfully completes the Reserve( ) command, step 1030.

If another node controller 221 has reserved the specified logical device, step 1020, and if the node controller 221 processing the Reserve( ) command has higher priority (that is to say in one embodiment, if the ID of the node controller 221 processing the Reserve( ) command is higher than the ID of the node controller 221 reserving the logical device), step 1050, the node controller 221 waits an interval of time, step 1045, and checks the table 390 again, step 1040. If an entry is still found, step 1020, the controller 221 returns from the Reserve( ) command with a reservation-conflict error, step 1035.

A situation may occur where two node controllers (say, 221*a* and 221*b*) receive Reserve( ) commands at the same time for the same logical device. The node controller 221*a* makes an entry in its reservation table 390*a*, step 1015, and attempts to reserve on the node controller 221*b*, steps 1040 and 1020. Substantially simultaneously, the node controller 221*b* makes an entry in its reservation table 390*b*, step 1015, and attempts to reserve on the node controller 221*a*, steps 1040 and 1020. Now each node controller 221 finds an entry in the other node controller 221's table 390. Here both node controllers 221*a* and 221*b* could effect a less than optimal solution: both returning a reservation-conflict error.

A more desirable way to resolve this situation is described below, involving higher- and lower-priority nodes 220. In one embodiment, priority is determined by relative SCSI IDs. Given any two node controllers 221 on the same SCSI bus 110, one has a higher SCSI ID than the other. Say node controller 221*a* has the higher SCSI ID. It is then the higher-priority node controller 221. Whenever the higher-priority node controller 221*a* finds an entry in the other lower-priority node controller 221*b* 's reservation table 390*b*, step 1020, and recognizes that it (node controller 221*a*) has higher priority, step 1050, it waits for a predetermined amount of time, step 1045, and checks the lower-priority node controller 221*b* 's table 390*b* again, step 1040.

If the higher-priority node controller 221*a* still finds an entry, step 1020, it responds with a reservation-conflict error to the Reserve( ) command, step 1035. However, if it does not find the entry on the later try, step 1020, it makes the reservation on the node controller 221*b*, step 1040, and successfully returns from the Reserve( ) command, step 1030.

Meanwhile, the node controller 221*b* finds a conflict, step 1020. Being lower priority, step 1050, it removes the entry from its own reservation table 390*b*, step 1035. When the higher-priority node controller 221*a* checks the table 390*b* again, step 1040, it does not find a reservation for the specified logical device, step 1020, and makes the reservation on the subordinate node controller 221*b*, step 1040.

Figure 19:
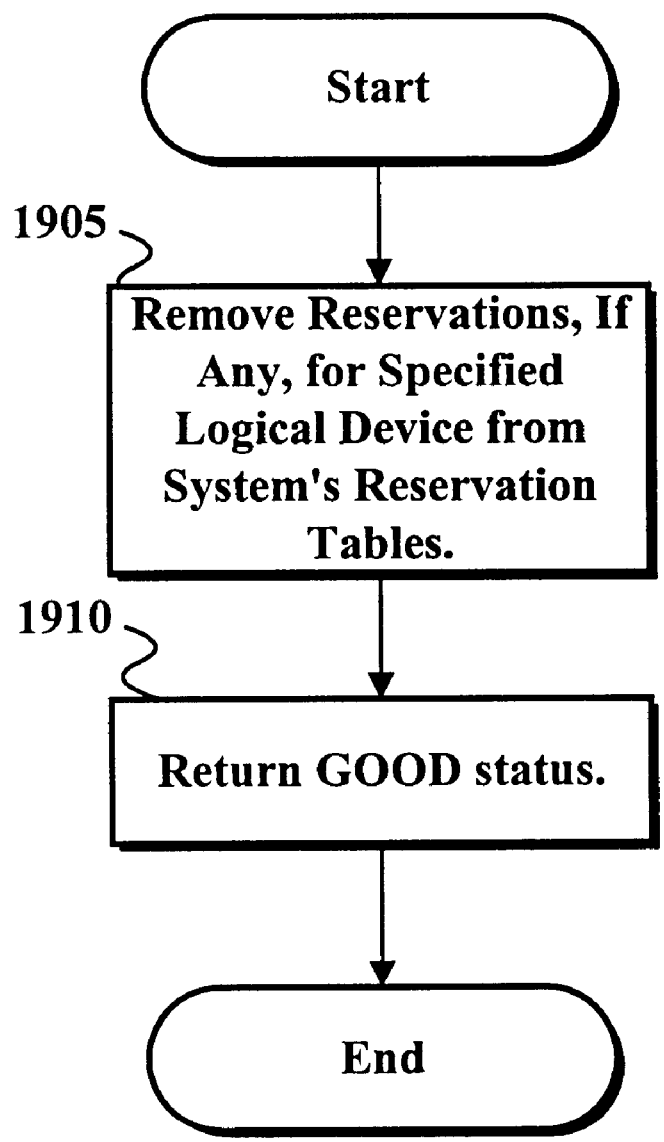
FIG. 19 is a flowchart illustrating flow of control in a node controller processing a SCSI Release( ) command.

FIG. 19 is a flowchart illustrating flow of control in a node controller 221 processing a SCSI Release( ) command. On a Release( ) command, a controller 221 removes the entry from its table 390 and from the table(s) 390 of the other node controller(s) 221, step 1905. The controller 221 returns GOOD status, step 1910. (The controller 221 returns a GOOD status even if the command is for a logical device that is not reserved on the controller 221.)

When a node controller 221 receives a Node_Release( ) command, step 1110, the node controller 221 removes any reservation for the specified logical device from its reservation table 390, step 1105.

When a node controller 221 receives a Heartbeat( ) command, step 1190, the node controller 221 returns a GOOD status, step 1196, if its status is in fact good, step 1193. Otherwise, the node controller 221 returns a CHECK CONDITION, step 1195.

When a slave node controller 221 receives a Node_Inform_Rebuild_Received( ) command, step 11A0, the node controller 221 sets its Node_State_Info to Rebuilding, step 11A5.

Figure 16:
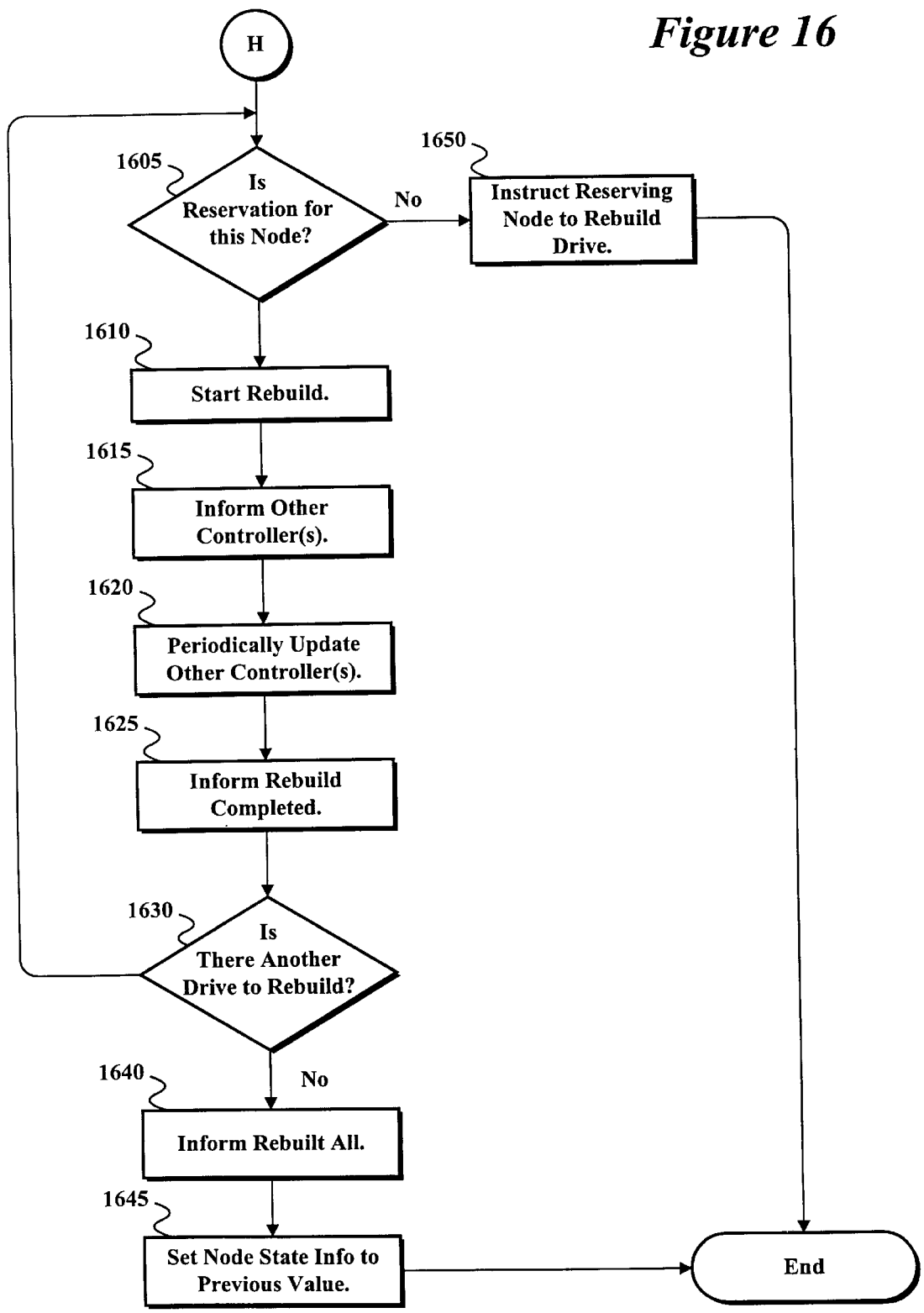
FIG. 16 is a flowchart illustrating flow of control in a master node controller on receipt of a node_Inform_Master_Rebuild_Received( ) command.

When a master node controller 221 receives a Node_Inform_Master_Rebuild_Received( ) command, step 11B0, the master node controller 221 checks whether it has reserved the specific logical device 130, step 1605. (FIG. 16 is a flowchart illustrating flow of control in a master node controller 221 on receipt of a Node_Inform_Master_Rebuild_Received( ) command.) If so, the master node controller 221 starts the rebuild of the specific logical device 130, step 1610, and informs the other node controller(s) 221 that it successfully started the rebuild, step 1615. The master node controller 221 sends subsequent, periodic progress updates to the other controller(s) 221, step 1620. On completion of the rebuild, the master node controller 221 sends a notification of that completion as necessary, step 1625. The master node controller 221 checks whether any more logical devices 130 need to be rebuilt, step 1630. If so, it starts the rebuild of the next logical device 130, step 1610. On the completion of the rebuild of all logical drives 170, the master node controller 221 sends a notification of that meta-completion as necessary, step 1640. The master node controller 221 change its Node_State_Info back to its previous value in preparation for accepting further rebuild commands, step 1645.

Figure 18:
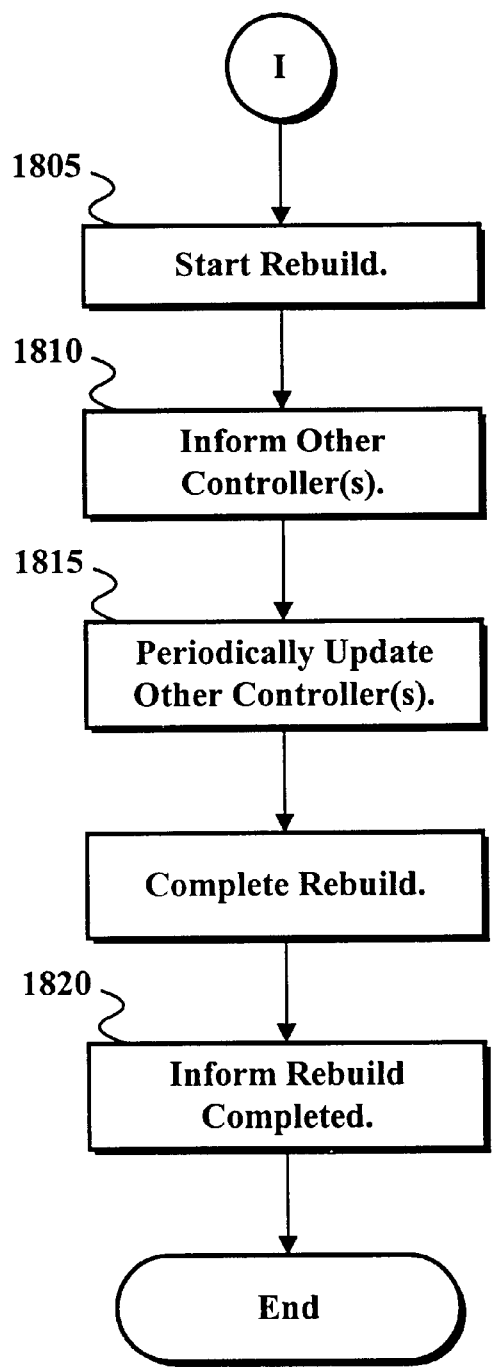
FIG. 18 is a flowchart illustrating flow of control in a node controller processing a Node_Rebuild( ) command.

FIG. 18 is a flowchart illustrating flow of control in a node controller processing a Node_Rebuild( ) command. When a slave node controller 221 receives a Node_Rebuild( ) command, step 11C0, the slave node controller 221 starts the rebuild of the specific logical device 130, step 1805, and informs the other node controller(s) 221 that it successfully started the rebuild, step 1810. The slave node controller 221 sends subsequent, periodic progress updates to any other controller(s) 221, step 1815. On completion of the rebuild, the slave node controller 221 sends a notification of that completion, step 1820.

When a node controller 221 receives a Node_Rebuild_Started( ) command, step 11D0, the node controller 221 notes the specifics of the rebuild, including its current status, step 11D5. In the event of, say, the failure of the node performing the rebuild or a query from a user regarding the status of the rebuild, the node 221 has sufficient state information to take over or provide status of the rebuild.

Similarly, when a node controller 221 receives a Node_Inform_Status( ) or Node_Inform_Rebuild_Completed( ) command, step 11E0 or 11F0, the node controller 221 updates its status for the rebuild, step 11E5.

When a slave node controller 221 receives a Node_Inform_Rebuilt_All( ) command, step 11G0, the slave node controller 221 updates it status for the rebuild, now changing its Node_Info_State back to its previous value, ready to accept a next rebuild command from a node 220, step 1180. (The master node controller 221 does not receive a Node_Inform_Rebuilt_All( ) as only it issues that particular command.)

Node Startup

Figure 4:
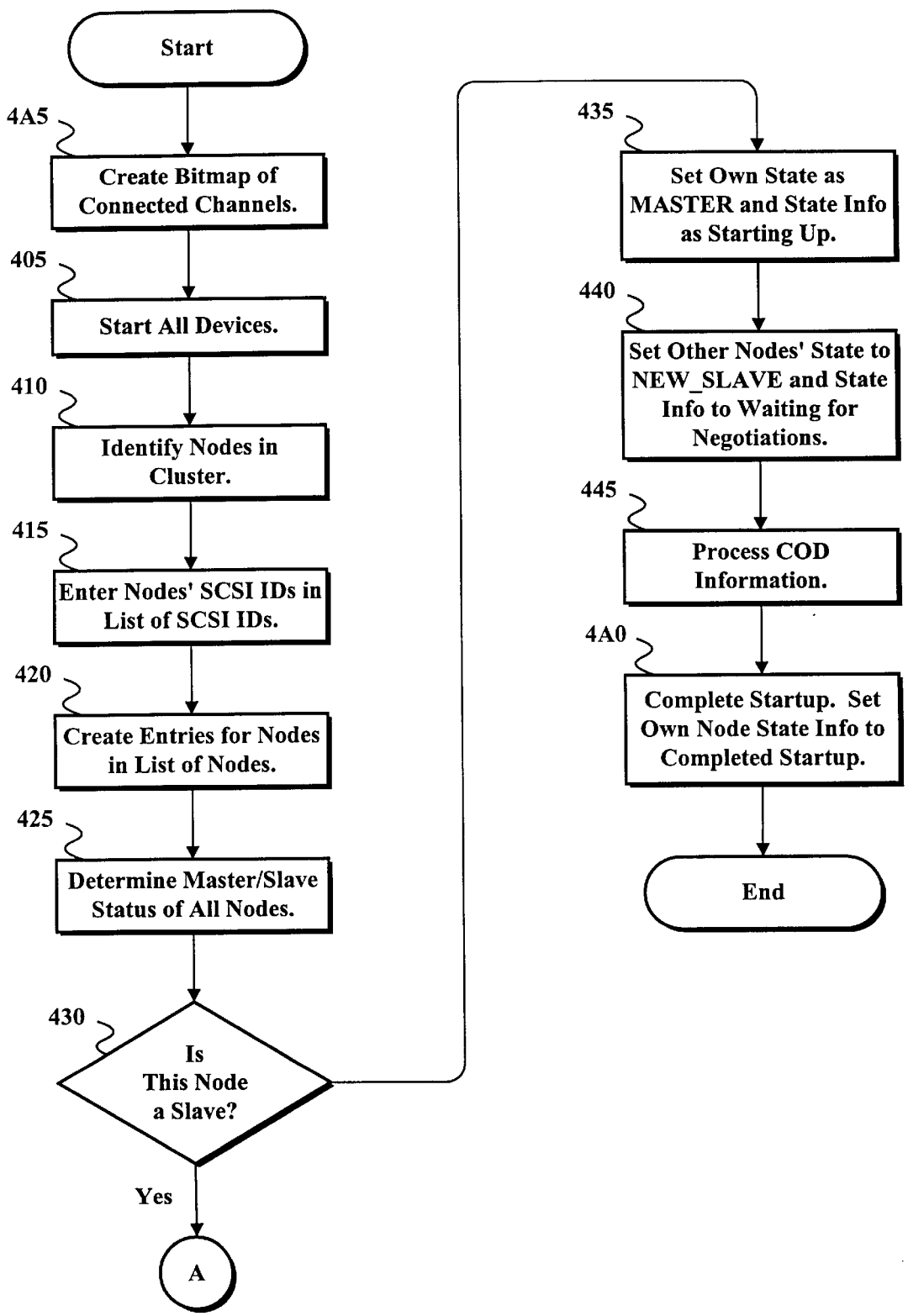
FIG. 4 is a flowchart illustrating the startup protocol for a master node.
Figure 5A:
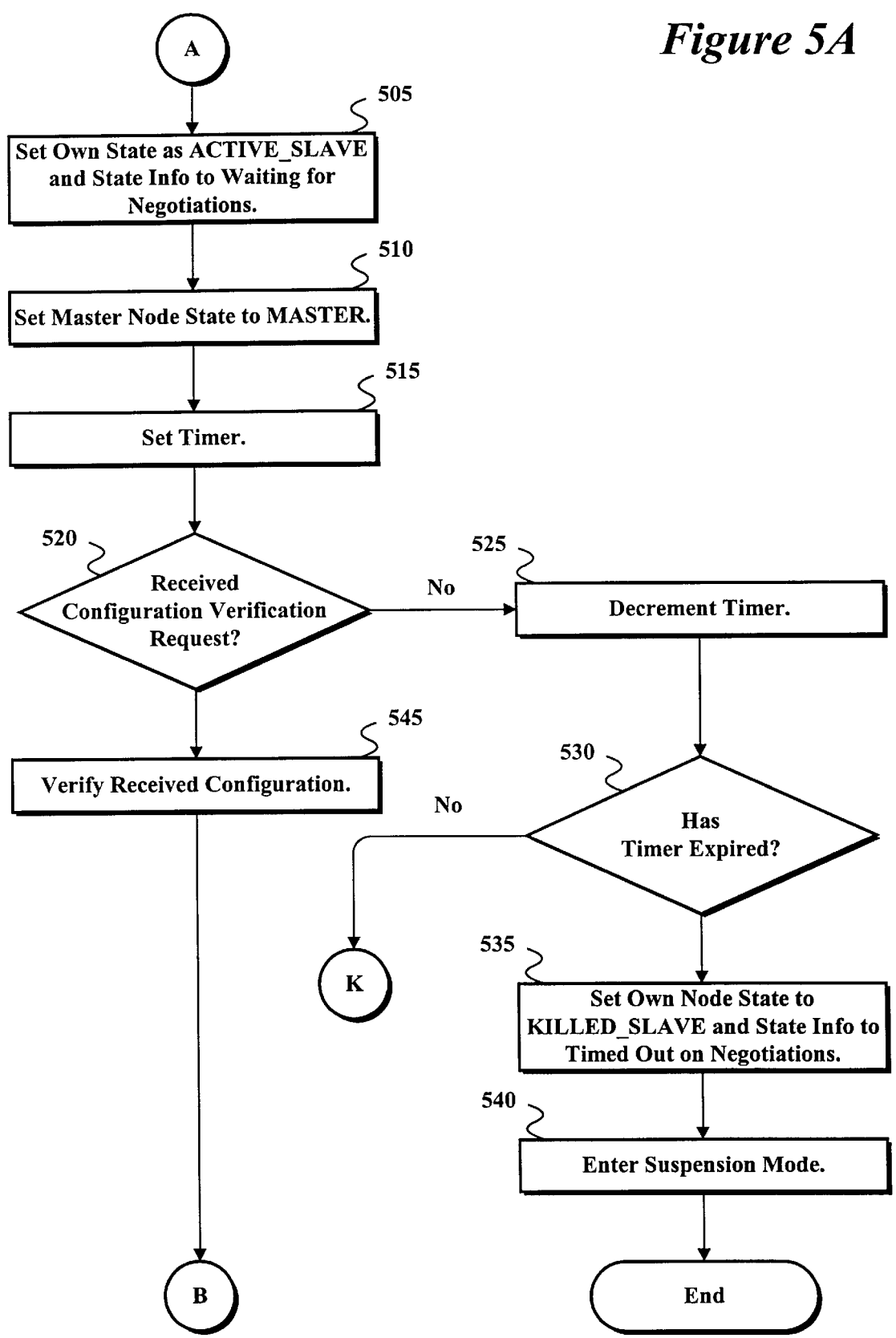
FIGS. 5A–5C compose a flowchart illustrating the startup protocol for a slave node.
Figure 5B:
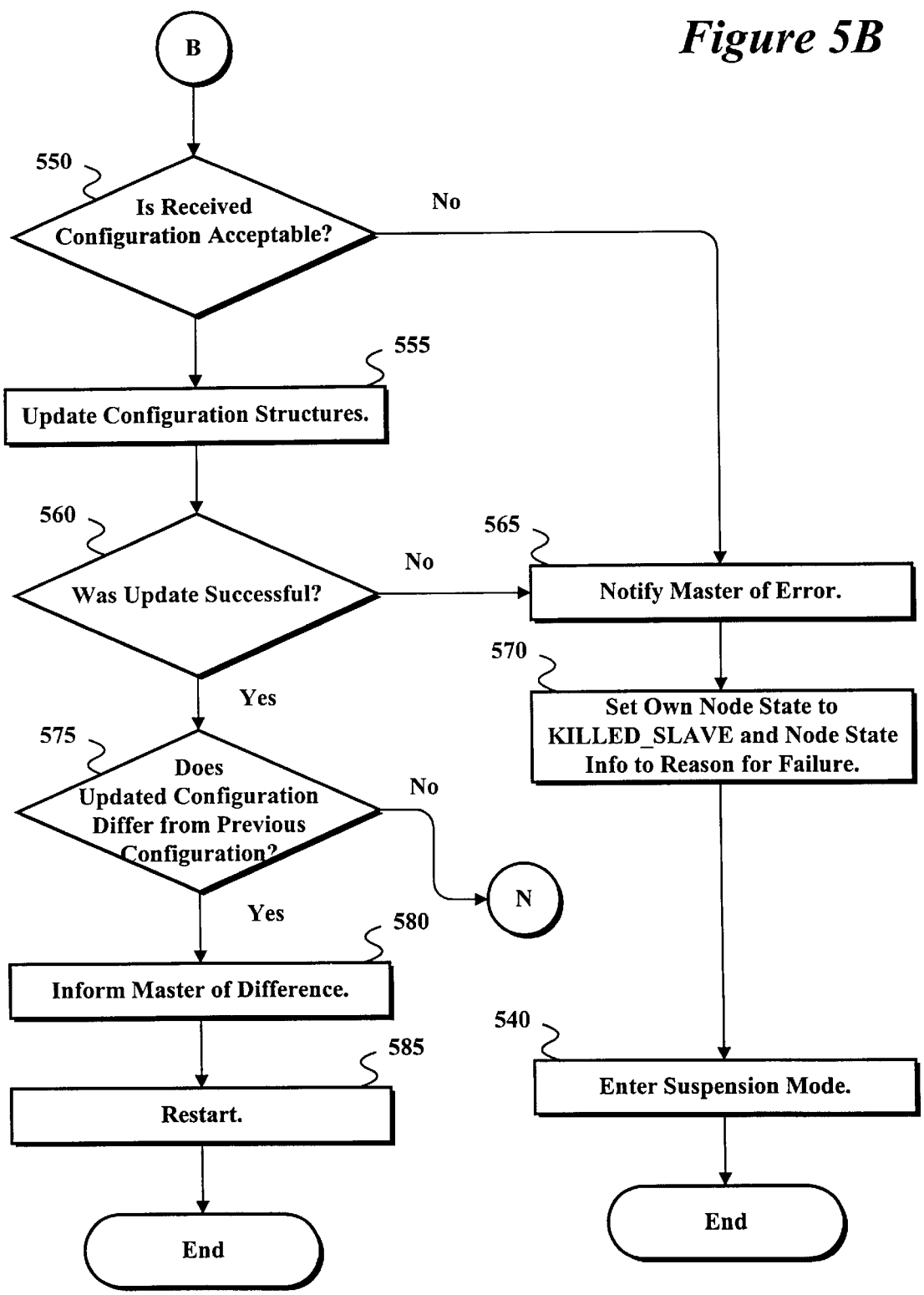
Figure 5C:
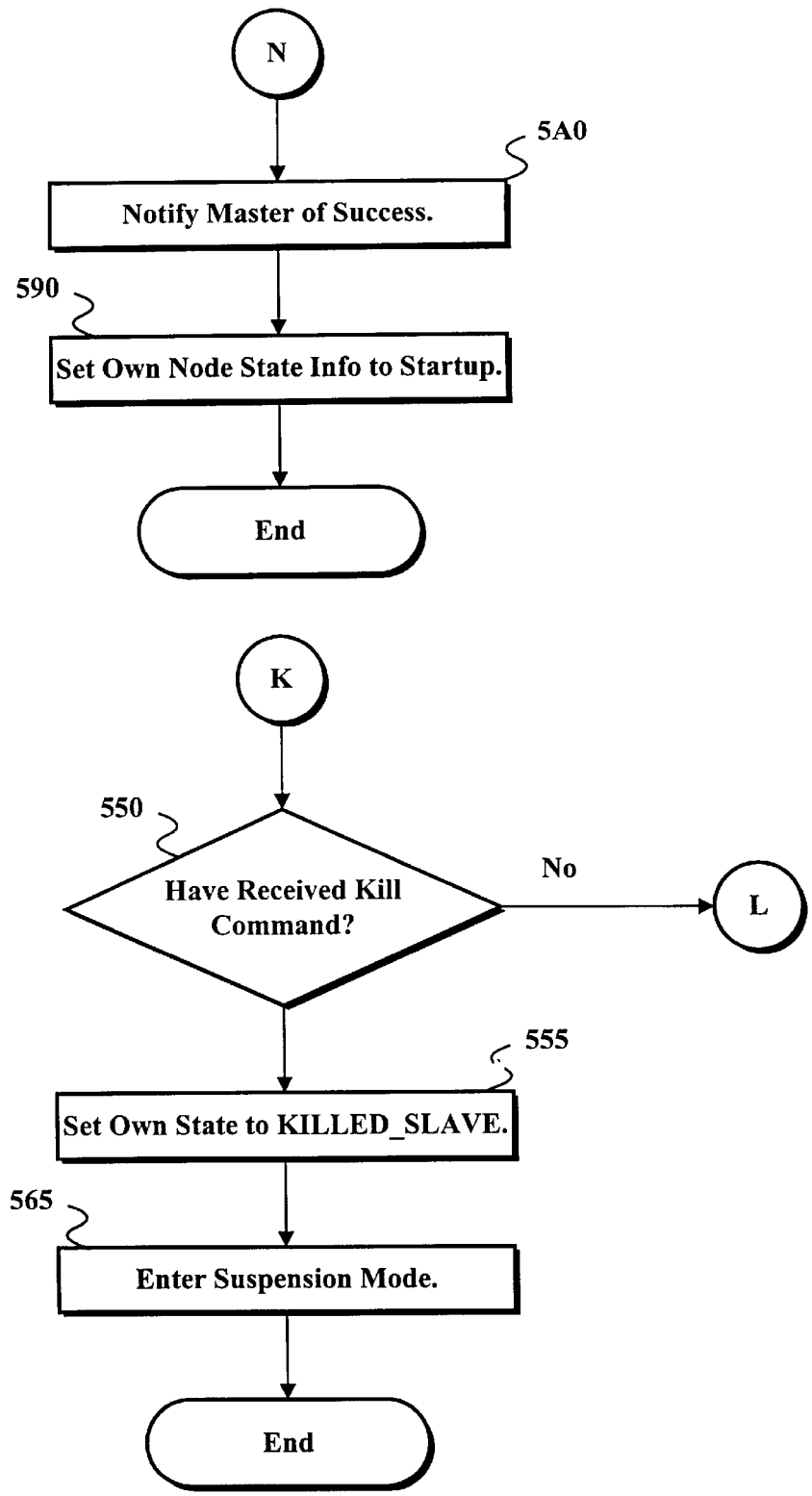

FIGS. 4 and 5A–5C illustrate the startup protocols, according to one embodiment of the invention. FIG. 4 illustrates the startup protocol for a master node controller 221, and FIGS. 5A–5C illustrate the startup protocol for a slave node controller 221.

When a SCSI device controller 221 starts up, it identifies and creates a bit map for all channels 110 connected to itself, step 4A5. The controller 221 also starts all of its devices 130, step 405, and identifies any other nodes 220 in the cluster system 200, step 410, in one embodiment by scanning the back-end SCSI channel(s) 110. (It may find no other node controller 221.) The controller 221 enters the SCSI IDs of all identified nodes 220 (including itself) in the list of SCSI IDs, Node_IDs, step 415.

In a single-node cluster system 200, the controller 221 does not identify any other node controller 221. The controller 221 sets itself to be the master of the cluster system 200, steps 425, 430 and 435. (Step 440 is essentially a NOOP.) The controller 221 processes COD information, step 445, updating its configuration as necessary, and completes its startup, step 4A0. It sets its Node_State_Info to Completed_Startup.

When multiple nodes 220 exist ab initio in the cluster system 200, each of the nodes 220 identifies all of the other nodes 220, step 410. All of the nodes 220 use the same predetermined algorithm to determine the master/slave relationship between themselves, step 425.

In one embodiment, each node controller 221 reads the state of all the other nodes 220. As all nodes 220 are just starting up, no node controller 221 is yet the master node controller 221. The nodes 220 compare SCSI IDs, and all nodes_220 set the master node controller 221 to be the node controller 221 with the highest SCSI ID, steps 425. All other nodes 220 are slaves.

The master node controller 221 initially sets the Node_State for itself as Master and its Node_State_Info as Starting_Up, step 435. The master node controller 221 also sets the Node_State of all other nodes 220 as NEW_SLAVE and the Node_State_Info of each other node controller 221 to Waiting_For_Negotiations, step 440.

The state MASTER applies to a node controller 221 designated as the master. Further, the master node controller 221 maintains the NEW_SLAVE, DIAGNOSED_SLAVE, RESTARTED_SLAVE, FAILED_SLAVE and NEXUS_SLAVE states regarding slave nodes 220.

A slave node controller 221 maintains the ACTIVE_SLAVE and KILLED_SLAVE states regarding itself.

Accordingly, on a slave node controller 221, the node controller 221 sets the Node State for itself as ACTIVE_SLAVE with Node State_Info of Waiting_For_Negotiations, step 505. A slave node controller 221 also sets the Node_State for the master node controller 221 to MASTER with the corresponding Node_State_Info set to Starting_Up, step 510.

A node 220 joining the cluster system 200 starts up with a power on or reset. These events cause the controller of the node 220 to issue a SCSI bus reset that in turn causes the master node controller 221 to scan the back-end SCSI channels again. The master node controller 221 at this point detects the presence of the new node controller 221, comparable to step 410. The controller 221 of the master node 220 enters the new node 220's SCSI ID in the node identifier list Node_ID, comparable to step 415.

The new node controller 221 also detects the master node controller 221 at the same time. Each of the nodes 220 reads the state of the other 220. The new node controller 221 thus learns that the master node controller 221 is in fact the master of the cluster system 220. The new node controller 221 accordingly makes itself a slave.

The controller 221 then creates a list, Nodes, listing all the nodes 220 identified in the Node_IDs list, step 420. Each entry in the Nodes list contains the node ID and the state of the node controller 221.

The master node controller 221 then processes COD information, step 445, while the slave node controller 221 skips processing COD information and waits for negotiations from the master node controller 221, steps 520, 525 and 530.

At initialization, the node controller 221 sets the node-communications channel 110 used for node-to-node communications, step 4B0.

The Monitor Process

Figure 8B:
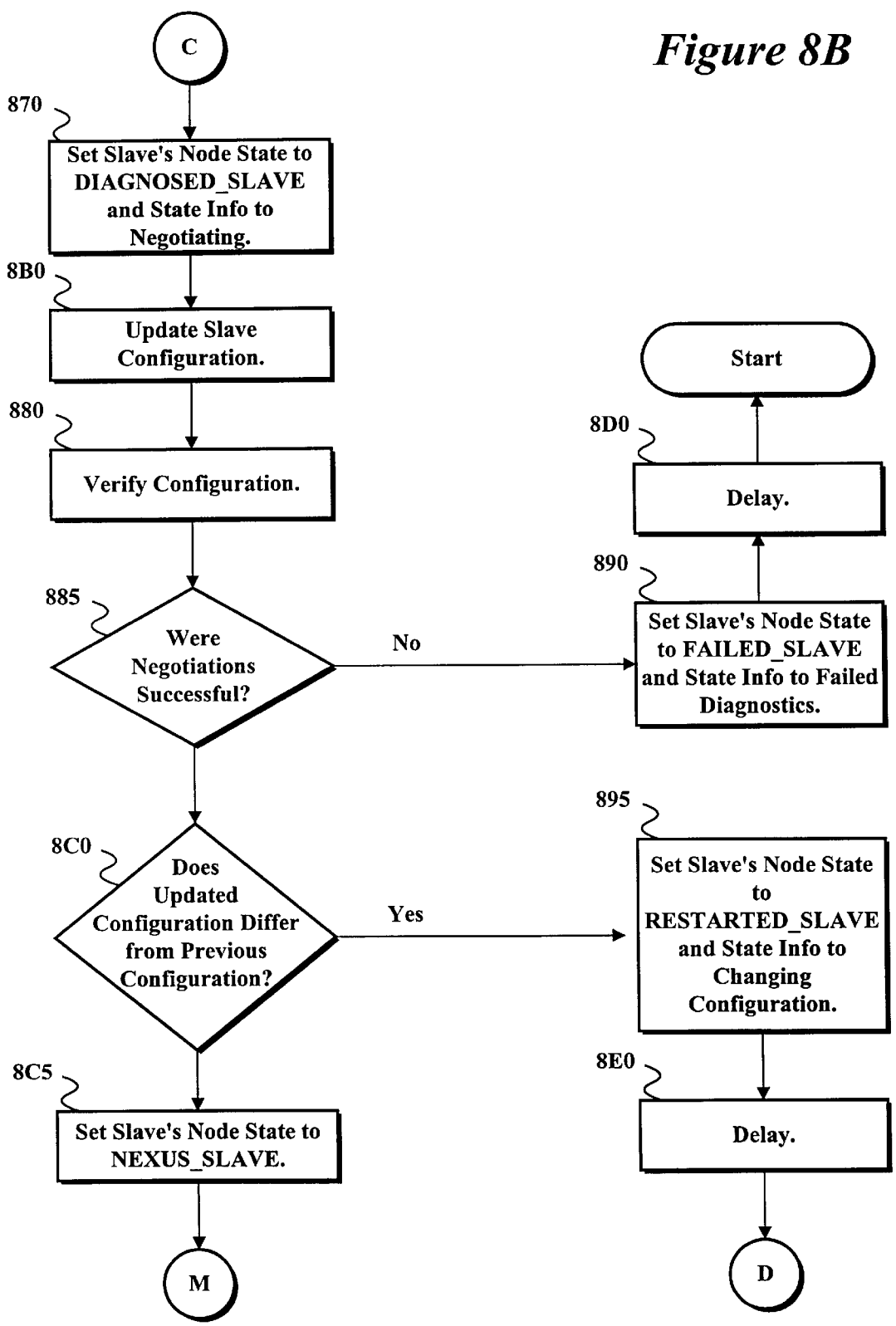
Figure 8C:
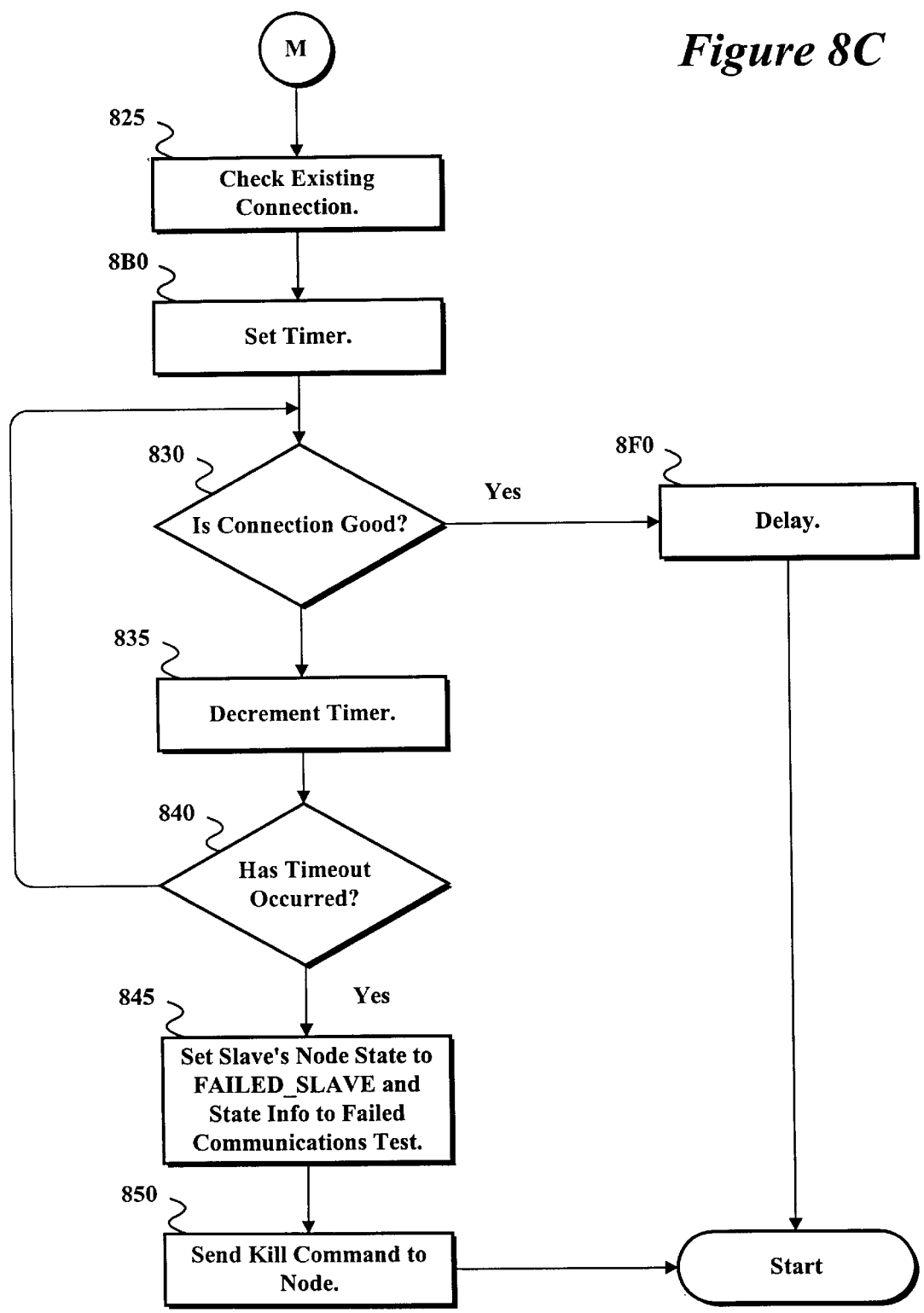

On completion of its startup, the master node controller 221 periodically runs a monitor process 380. (The periodicity has been determined empirically to be about every 5 seconds.) FIGS. 8A–8C compose a flowchart illustrating actions of the monitor process 380.

The monitor process 380 searches the node identifier list Node_ID to see if a new node 220 entered the cluster system 200 since its last check, step 805. If the monitor process 380 finds a new node 220, step 810, it creates an entry in the nodes list Nodes, step 815. The new entry has the Node_ID of the newly found node 220, a Node_State of NEW_SLAVE and a Node_State_Info of Waiting_For_Negotiations.

The master node controller 221 performs diagnostics on the new slave node, step 860. These may include cable-check and memory tests. If the slave node performs the diagnostics successfully, step 865, the master node controller 221 sets the Node_State of the slave node controller 221 in the master node controller 221 to DIAGNOSED_SLAVE with the corresponding Node_State_Info set to Negotiating, step 870.

If diagnostics fail, step 865, the master node controller 221 changes the Node_State of the slave node controller 221 to FAILED_SLAVE with the corresponding Node_State_Info set to Failed_Diagnostics, step 875. The monitor process 380 completes its tasks, delays (i.e., sleeps on an alarm, dies and resurrects on a timer, loops, etc.), step 8A0, and begins again to search for new nodes 220, step 805.

On the master node controller 221 determining the slave node controller 221 to be a FAILED_SLAVE, that slave node controller 221 times out waiting for negotiations with the master node controller 221, steps 520, 525 and 530. On the timeout, the slave node controller 221 changes its Node_State to KILLED_SLAVE with Node_State_Info of Timed_Out_On_Negotiations, step 535. Finally, the slave node controller 221 puts itself into a suspension mode, step 540.

On successful diagnostics, step 865, the master node controller 221 updates the configuration and other information of the slave, step 8B0. The master node controller 221, using the Negotiate( ) command, requests the slave controller 221 to verify the information, step 880. The slave node controller 221 verifies the configuration, step 545, scanning the bus again. If the new configuration is acceptable, step 550, the slave node controller 221 updates its EEPROM, NVM and other configuration structures as necessary, step 555.

The Negotiate( ) command may fail either because the master node controller 221's configuration does not match that of the slave node or because the write to the configuration structures failed. In either of these failing situations, step 885, the master node controller 221 puts the slave node controller 221 in the FAILED_SLAVE state with Node_State_Info giving the reason for failure, step 890. Further, the slave node controller 221 changes its Node_State to KILLED_SLAVE with Node_State_Info giving the reason, steps 550, 560 and 570, and goes into a suspension mode, step 540.

On successful negotiation, steps 550 and 560, if the new configuration of the slave node controller 221 is different from what the slave node controller 221 had earlier, step 575, the slave node controller 221 so informs the master node controller 221, step 580, and restarts itself, step 585. The master node controller 221 changes its Node_State of the slave node controller 221 to RESTARTED_SLAVE with Node_State_Info set to Changing_Configuration, step 895. The master node controller 221 then resumes negotiations after a specified interval of time, steps 8E0 and 860 through and 880.

If the new configuration of the slave node controller 221 is the same as what the slave node controller 221 had earlier, step 575, the slave node controller 221 completes its startup. The master node controller 221 changes its Node_State of the slave node controller 221 to NEXUS_SLAVE and the corresponding Node_State_Info to None, steps 8C0 and 8C5. The master node controller 221 completes its tasks. Both controllers 221 are ready to accept commands.

(Of course, where the master node controller 221 detects more than one new node 220, the master node controller 221 may perform the above steps in parallel for two or more of the new nodes 220.)

Figure 17:
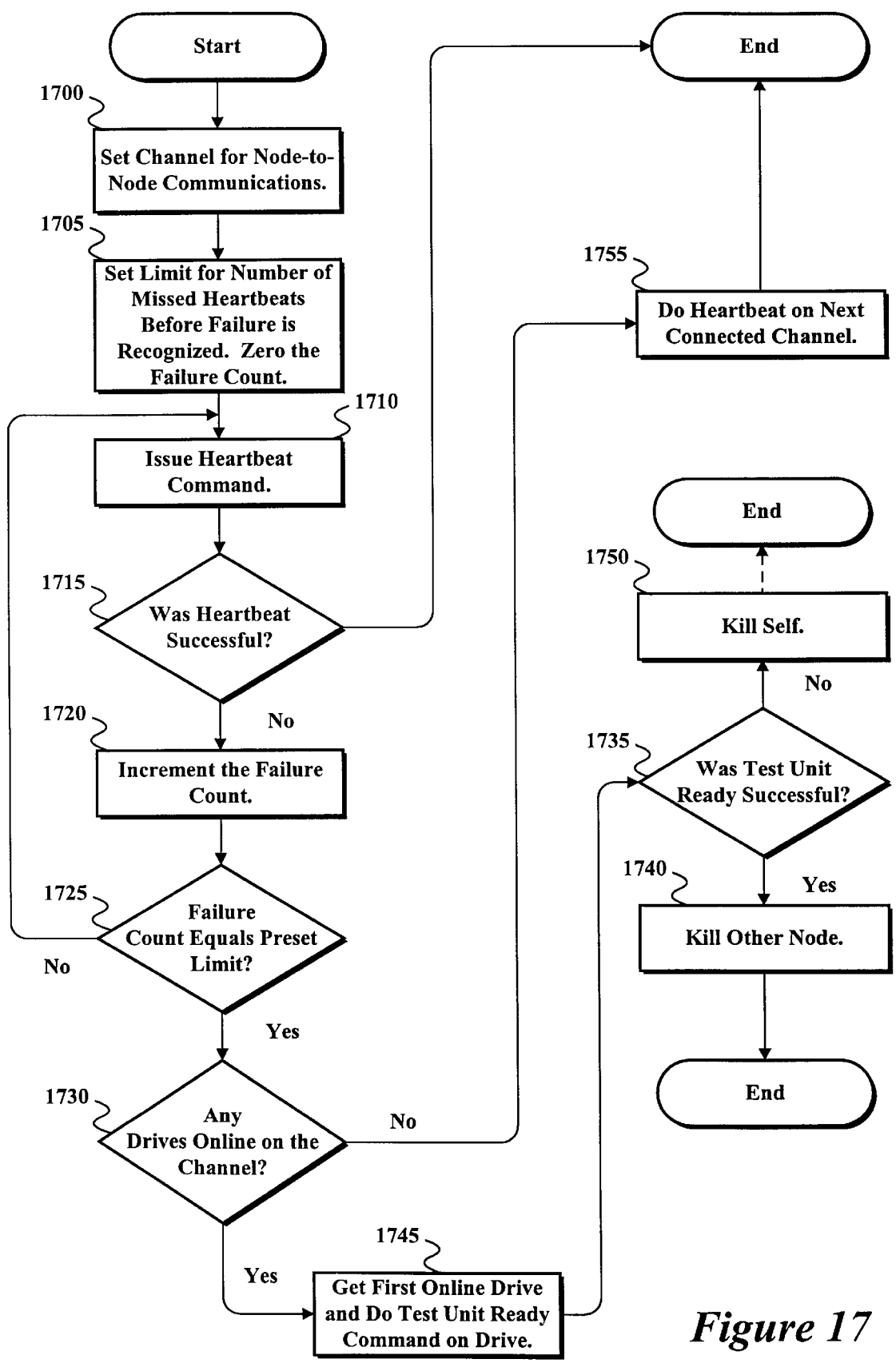
FIG. 17 is a flowchart illustrating flow of control in a node controller monitoring another controller.

FIG. 17 is a flowchart illustrating flow of control in a node controller 221 monitoring another controller 221. The master node controller 221 monitors the slave node controllers 221 and vice versa, issuing Heartbeat( ) commands, step 1710. (For efficiency reasons, slave node controllers 221 do not monitor each other.) As long as a Heartbeat( ) command is successful, step 1715, the master node controller and slave node controller 221 are in nexus. (In one embodiment, the Heartbeat( ) command fails four consecutive times before a node controller 221 recognizes (i.e., formally acknowledges) a Heartbeat( ) failure and proceeds to change another node controller 221's status to FAILED_SLAVE, steps 1705, 1720 and 1725.)

If a Heartbeat( ) command fails, step 1715, the failure-detecting node controller 221 tries to determine the cause of failure. The Heartbeat( ) can fail for either of the following two reasons: (1) the other node 220 reset or powered off or (2) the cable of the node-communications channel 110 failed. If cable failure caused the Heartbeat( ) failure, the node controller 221 kills itself, but if the other node 220 is cycling, the node controller 221 attempts communications on the next connected channel.

More particularly, the failure-detecting node controller 221 determines the first drive 2061 online on the node-communications channel 110, step 1745. If no drive 2061 is online on the channel, step 1730, the node sets the node-communications channel to the next connected channel, as indicated by the Connected_Channels bit map, and performs the Heartbeat( ) command on the next connected channel, step 1755.

Where a drive 2061 is available and online on the node-communications channel 110, step 1730, the node controller 221 sends a Test Unit Ready( ) command to that drive 2061, step 1745. Where the Test Unit Ready( ) command is successful, step 1735, the cable presumptively has not failed. Accordingly, the node controller 221 detecting the Heartbeat( ) failure changes the Node State of the failing node controller 221 to FAILED_SLAVE. The failure-detecting node controller 221 then attempts to kill the failing node controller 221 with a Node_Kill( ) command, step 1740.

Where a drive 2061 is available and online on the node-communications channel 110, step 1730, but the Test Unit Ready( ) command is unsuccessful, step 1735, the cable presumptively has failed. Accordingly, the node controller 221 detecting the Heartbeat( ) failure kills itself, step 1750.

If the failing, killed node controller 221 is the master node controller 221, then the surviving node controllers 221 arbitrate for the role of the master (as in step 428, for example). If the former master controller 221 resets and attempts to re-join the cluster system 200 again, it assumes the role of a slave controller 221 in the protocols and processes described herein. As a corollary, the former-slave, now-master controller 221 treats the former-master controller 221 as a slave node controller 221.

Because the detection of the failure of a node 220 can take a relatively long time in terms of computer systems (in one embodiment, fifteen seconds), a node 220 can fail and recover before another node 220 has time to detect the failure. If the failure is not detected and correctly dealt with, the recovering node 220 may not be able to establish a nexus with the computer system 200.

To avoid this failure-to-detect-failure scenario, a controller 221 of a node 220 of a computer system 200 detects other nodes 220 in the system 200 after a bus reset by scanning the bus(es) 110 and obtaining SCSI IDs as described herein. In addition, the node controller 221 sends an Inquiry( ) command to a detected node 220. From the Inquiry( ) data returned, the scanning node controller 221 can determine whether the detected node controller 221 is in the process of booting up (i.e., recently failed) or is already up (i.e., already in nexus). In one embodiment, with the Inquiry( ) data fields set as indicated in Table 20, byte 36 (vendor-specific data) is a flag indicating whether the node 220 is in the booting process.

A node 220 that failed to detect the failure of another node 220 (due, for example, to the quickness of the power cycle or the reset) can parse the Inquiry( ) data to determine whether any node 220 is booting up and thus not in nexus. The inquiring node 220 compares its Node_State for the other node 220 with the Inquiry( ) data and thus determines whether the other node 220 had failed. If the other node had failed, the inquiring node 220 sets its Node_State and Node_State_Info for the other node as NEW_SLAVE, Waiting_For_Negotiations. Where the recovering node 220 was the master node 220, the new master node 220 sets its own state as MASTER and proceeds to establish nexus with the recovery node 220.

In addition to detecting new nodes 220, the monitor process 380 also checks existing connections, step 825 (for example, directing the master node controller 221 to write to a slave node controller 221's memory 310). If the check times out, steps 830 through 840, the master node controller 221 changes its Node_State of the slave node controller 221 to FAILED_SLAVE and the corresponding Node_State_Info to Failed_Communications_Test, step 845. The master node controller 221 then puts the slave node controller 221 in a suspension mode, step 850. This step 850 may or may not succeed, depending on the nature of the communications failure.

If a node controller, say, 221a, determines that another node controller, say, 221b, is not functioning satisfactorily, then the node controller 221a kills the other node controller 221b, using the Node_Kill( ) command. If the killed node controller 221b is the master node controller 221, then it loses that status. The surviving node controllers (including controller 221a) arbitrate to become the master node controller 221 (as in step 425, for example).

Figure 6:
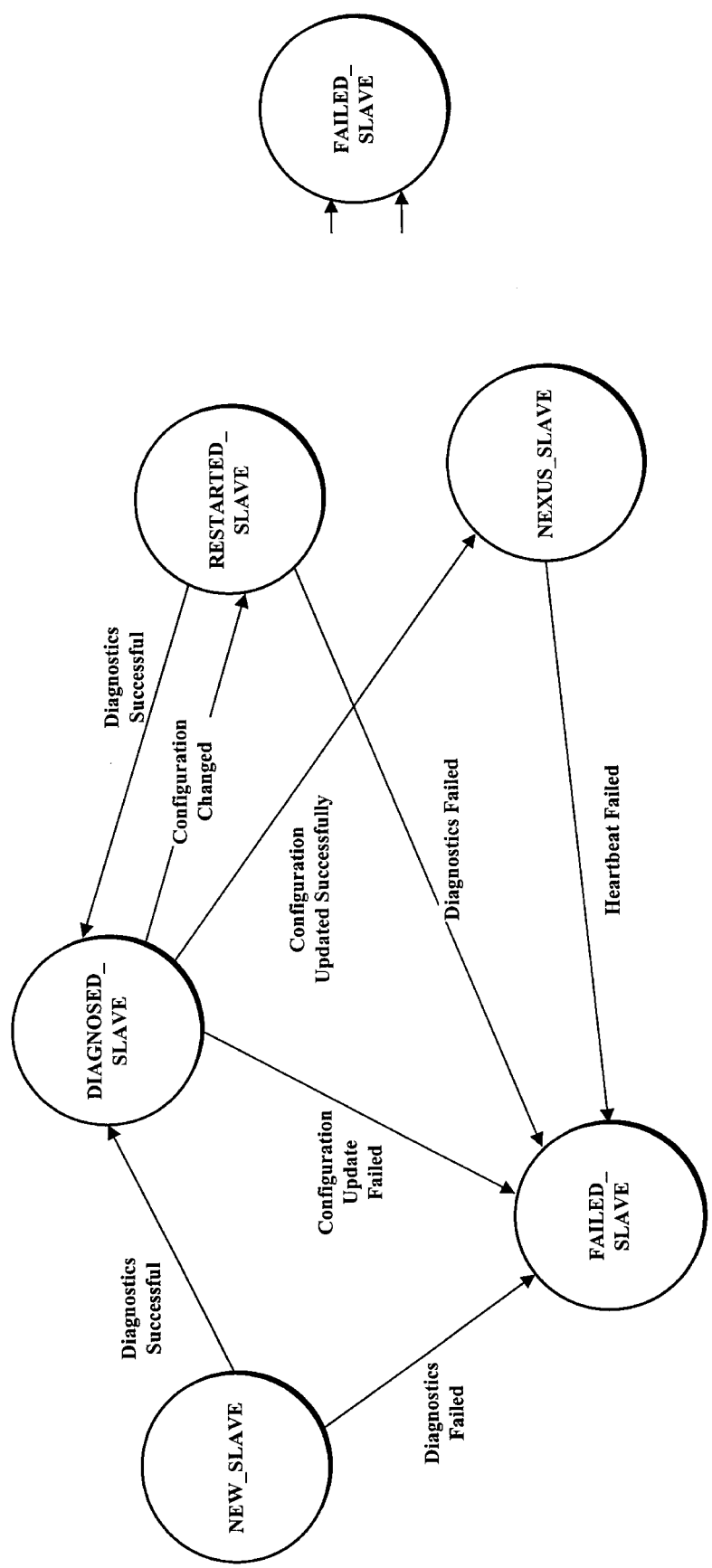
FIG. 6 is a state diagram giving the states transitions a master node makes regarding a slave node.
Figure 7:
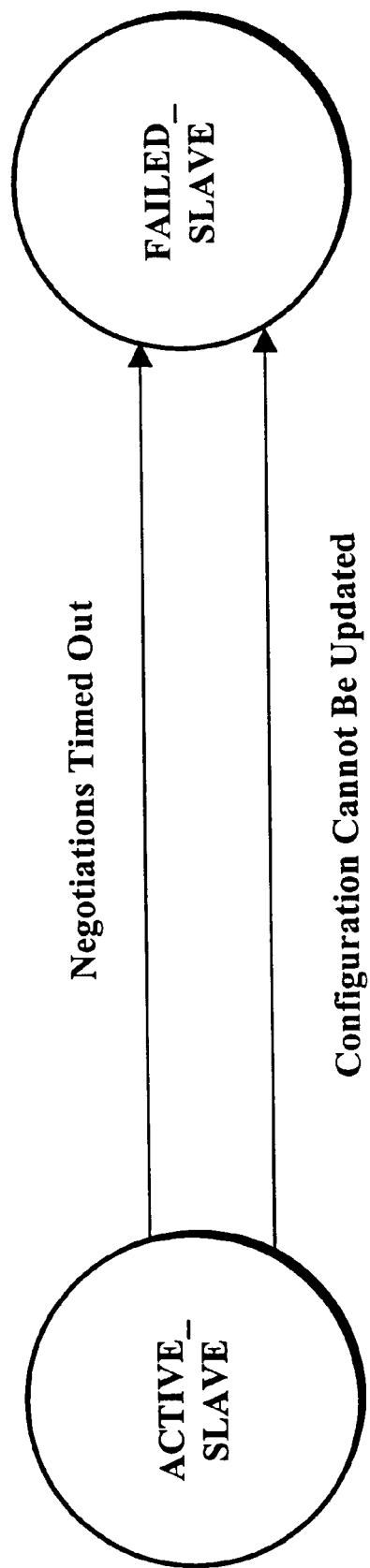
FIG. 7 is a state diagram giving the state transitions a slave node makes regarding itself.

FIG. 6 is a state diagram giving the states transitions a master node controller 221 makes regarding a slave node controller 221. FIG. 7 is a state diagram giving the state transitions a slave node controller 221 makes regarding itself.

Configuration Changes

Every time the configuration changes in the master node controller 221, the master node controller 221 updates itself, the SCSI devices 2061 and the slave node(s) 220 with the changed configuration. If the configuration changes on a slave node controller 221, the slave node controller 221 updates itself and informs the master node controller 221. The master node controller 221 then updates itself, any other slave node controllers 221 and all the devices 2061. In one embodiment, only the master node controller 221 writes configurations to the devices 2061.

A controller 221 detecting cable failure can potentially kill all the drives on the failing channel and distribute the resulting configuration by negotiation, causing I/O from other node controllers 221 to these killed drives to also then fail. Before, however, another controller 221 enters negotiations to update the configuration of the system 200 in response to a Negotiate( ) command, it attempts to determine whether the configuration change is due to cable failure. If a cable failure caused the configuration change, it refrains from negotiating a new configuration for the system 200 and instead kills itself.

More particularly, on receiving a Negotiate( ) command, the node controller 221 sets the channel for testing to the first connected channel, step 1510. The controller 221 then checks that channel for testing, step 1515. If the channel passes the test, step 1520, the controller checks for more channels, step 1525. Where there are more channels, the controller 221 sets up the next connected channel as the current channel for testing, step 1530, and repeats the check of the channel for testing, step 1515.

Where the channel does not pass the test, step 1520, the controller determines whether any physical drives are online on the channel failing the channel check, step 1540. Where there are no online drives on the channel, the controller 221 proceeds to set up the next connected channel, if any (step 1525), as the current channel for testing, step 1530, and repeats the check of the channel for testing, step 1515.

Where there is a drive online on the channel failing the channel check, step 1540, the controller gets the first drive online on the channel, step 1545, and performs a Test Unit Ready( ) command on the drive, step 1550. If the Test Unit Ready( ) command succeeds, step 1555, the controller proceeds with the negotiation of the configuration change, step 1560, secure that a cable failure did not cause the configuration change.

Where, however, the Test Unit Ready( ) command fails, the node controller 221 kills itself, step 1565, having determined that the configuration change is due to a cable failure.

Where there are no more connected channels, step 1525, the controller 221 proceeds to negotiate the change in configuration of the system 200, step 1570, having determined that the change is not due to a cable failure.

Rebuild of a Logical Device

Figure 14:
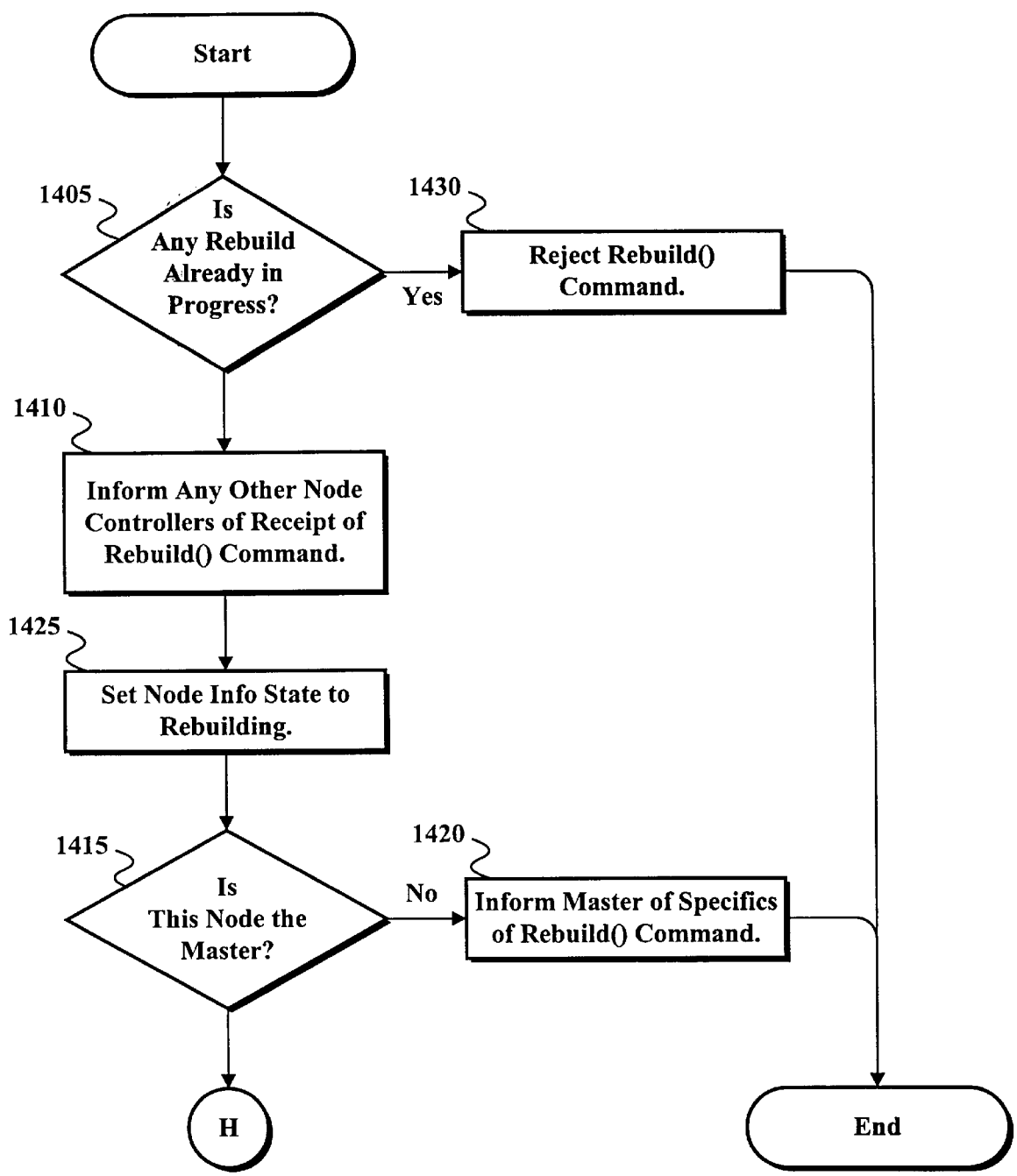
FIG. 14 is a flowchart illustrating flow of control in a node controller receiving a rebuild command.
Figure 15:
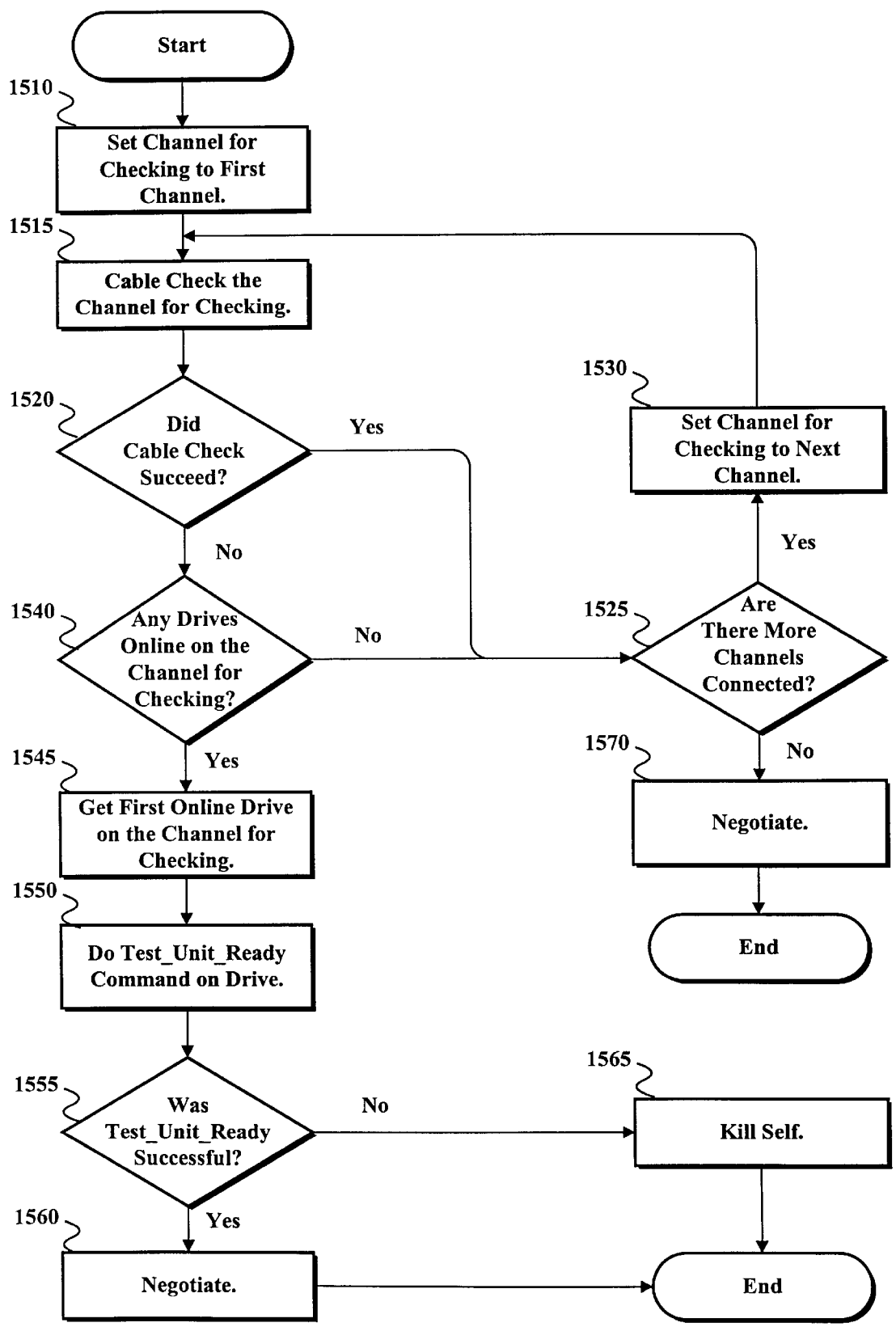
FIG. 15 is a flowchart illustrating flow of control in a node controller confirming a reported configuration change.

FIG. 14 is a flowchart illustrating flow of control in a node controller 221 receiving a rebuild command. A node controller 221 receiving a rebuild command from its node 220 checks whether any rebuild is in process in the cluster system 200, step 1405. If no rebuild is in progress, the node controller 221 sends Node_Inform_Rebuild_Received( ) commands to any other node controllers 221, step 1410. If the node_controller 221 is a slave controller 221, step 1415, then the node controller 221 additionally sends a Node_Inform_Master_Rebuild_Received( ) command, step 1420. Independent of its master/slave status, the node 221 controller sets its Node_State_Info to Rebuilding, step 1425.

On receipt of a Node_Inform_Rebuild_Received( ) command, step 11A0, a node controller 221 sets its Node_State_Info to Rebuilding, step 11A5. In one embodiment, the cluster system 200 permits only one rebuild at a time. Any node controller 221 in a Rebuilding state rejects any subsequent rebuild command from its node 220, steps 1405 and 1430.

FIG. 16 is a flowchart illustrating flow of control in a master node controller 221 on receipt of a Node_Inform_Master_Rebuild_Received( ) command. When the master node controller 221 receives the specifics of a rebuild command (directly from its node 220 or indirectly from a slave node controller Node_Inform_Master_Rebuild_Received( ) command), step 11B0, the master node controller 221 checks whether it owns the specific logical device 130, step 1605. If so, the master node controller 221 starts the rebuild of the specific logical device 130, step 1610. It sends out Node_Inform_Rebuild_Started( ) commands, step 1615, and subsequent, periodic Node_Inform_Status( ) commands to any other controllers 221, step 1620. On completion of the rebuild, the master node controller 221 sends Node_Inform_Rebuild_Completed( ) commands, step 1625, and checks whether any more logical devices 130 need to be rebuilt, step 1630. If so, it starts the rebuild of the next logical device 130, step 1605. On the completion of the rebuild of all logical drives dependent on a failed physical drive 2061, step 1630, the master node controller 221 sends Node_Inform_Rebuilt_All( ) commands as necessary, step 1640. The master node controller 221 changes its Node_State_Info back to its previous value in preparation for accepting further rebuild commands, step 1645.

Where the master node controller 221 does not have the reservation for the specific logical device, step 1605, it determines which node controller 221 does have the reservation. It sends a Node_Rebuild( ) command to that determined node controller 221, step 1650.

On receipt of a Node_Rebuild( ) command, step 11C0, a slave node controller 221 starts the rebuild of the specific logical device, step 1805. It also sends Node_Inform_Rebuild_Started( ) commands and subsequent, periodic Node_Inform_Status( ) commands to the other node controller(s) 221, steps 1810 and 1815. On completion of the rebuild, the slave node controller 221 sends Node_Inform_Rebuild_Completed( ) commands as necessary, step 1820.

The preceding description also applies to a node controller 221's detecting and initiating a rebuild without the intercession of a node 220, for example, on the automatic detection of the removal and insertion of a physical drive 2061 constituting a logical drive 130.

Figure 20:
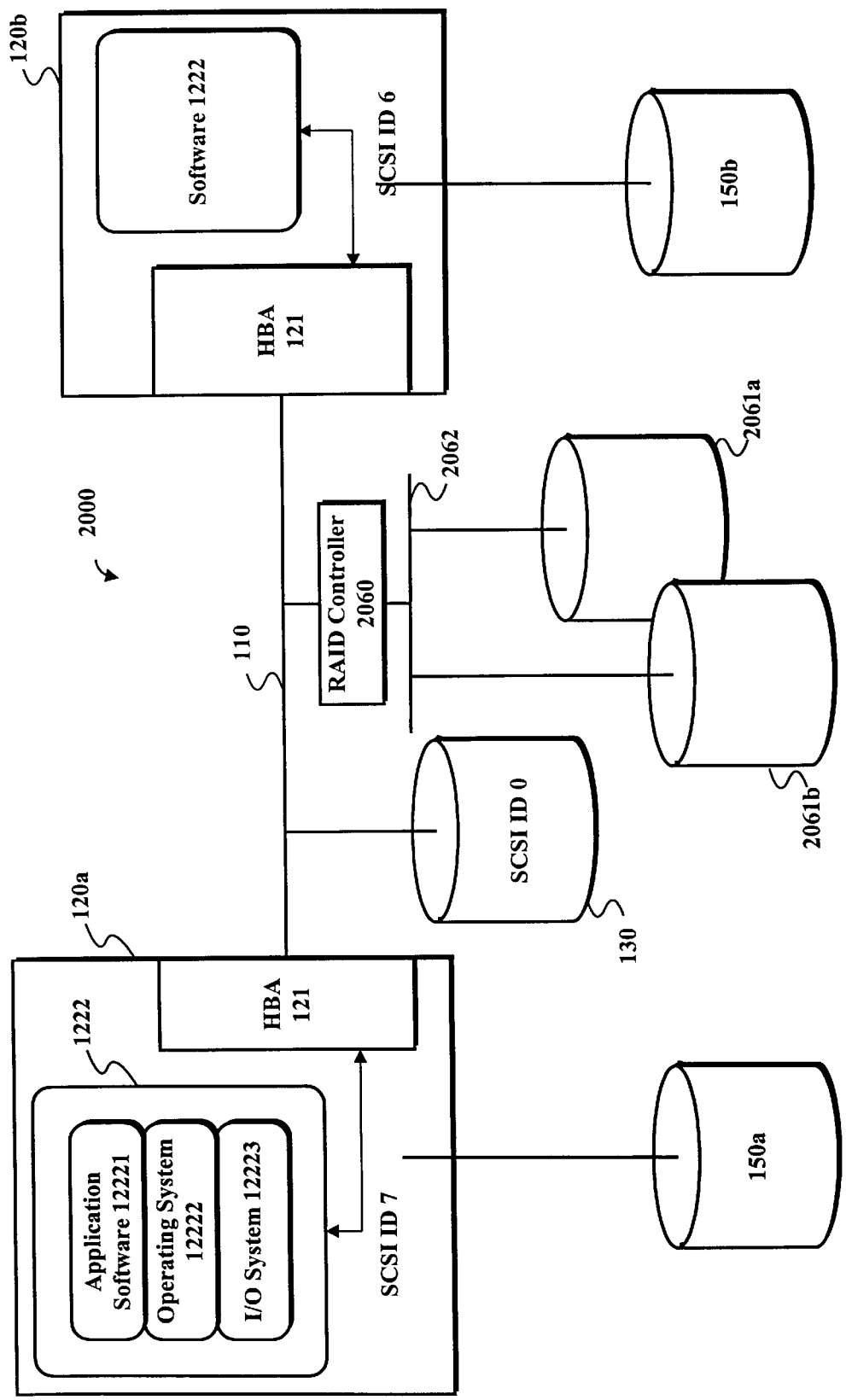
FIG. 20 illustrates the physical view of a second cluster system implemented on a SCSI bus with an external RAID controller, according to the prior art.
Figure 21:
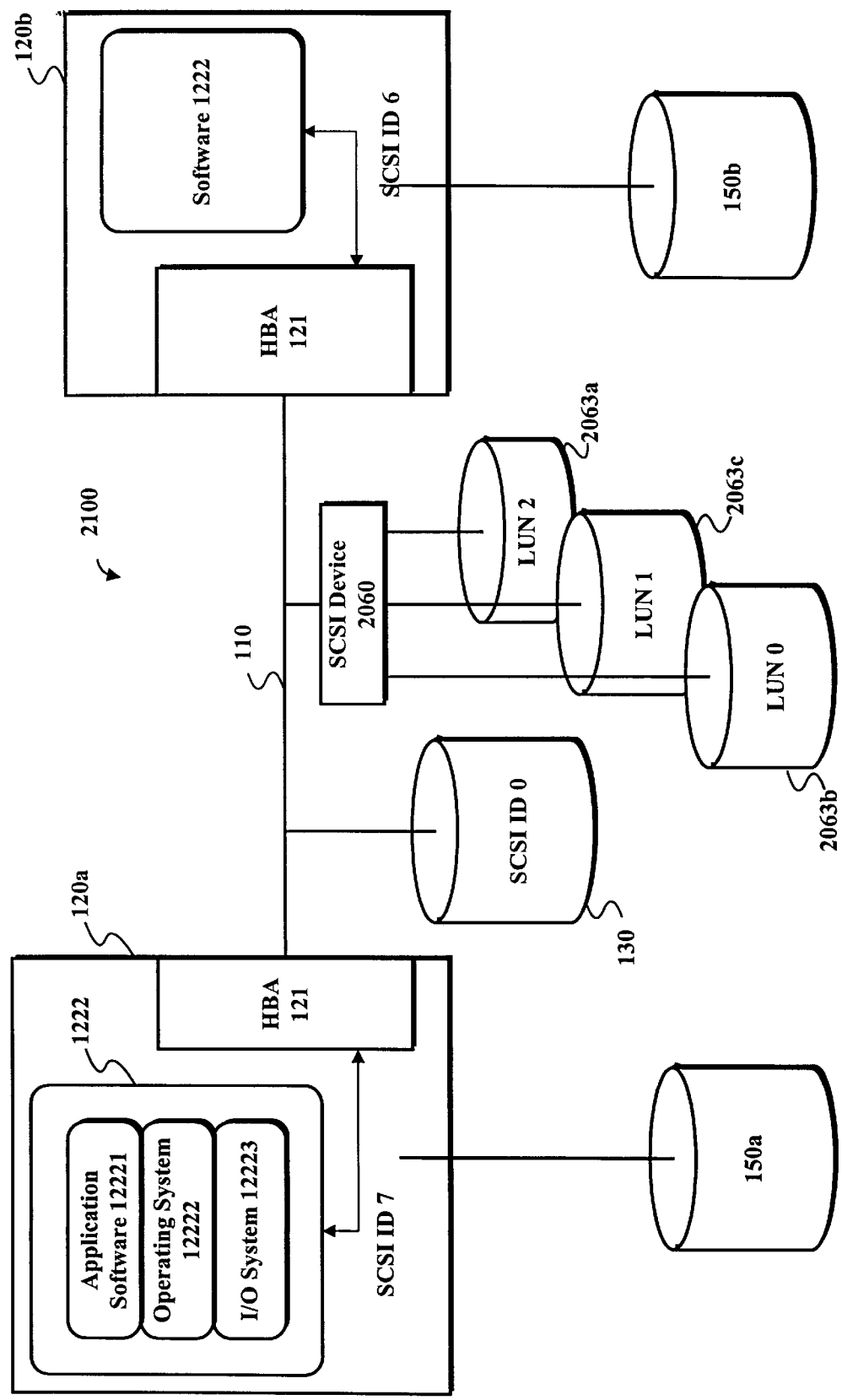
FIG. 21 illustrates the logical view of the cluster system of FIG. 20.
Figure 22:
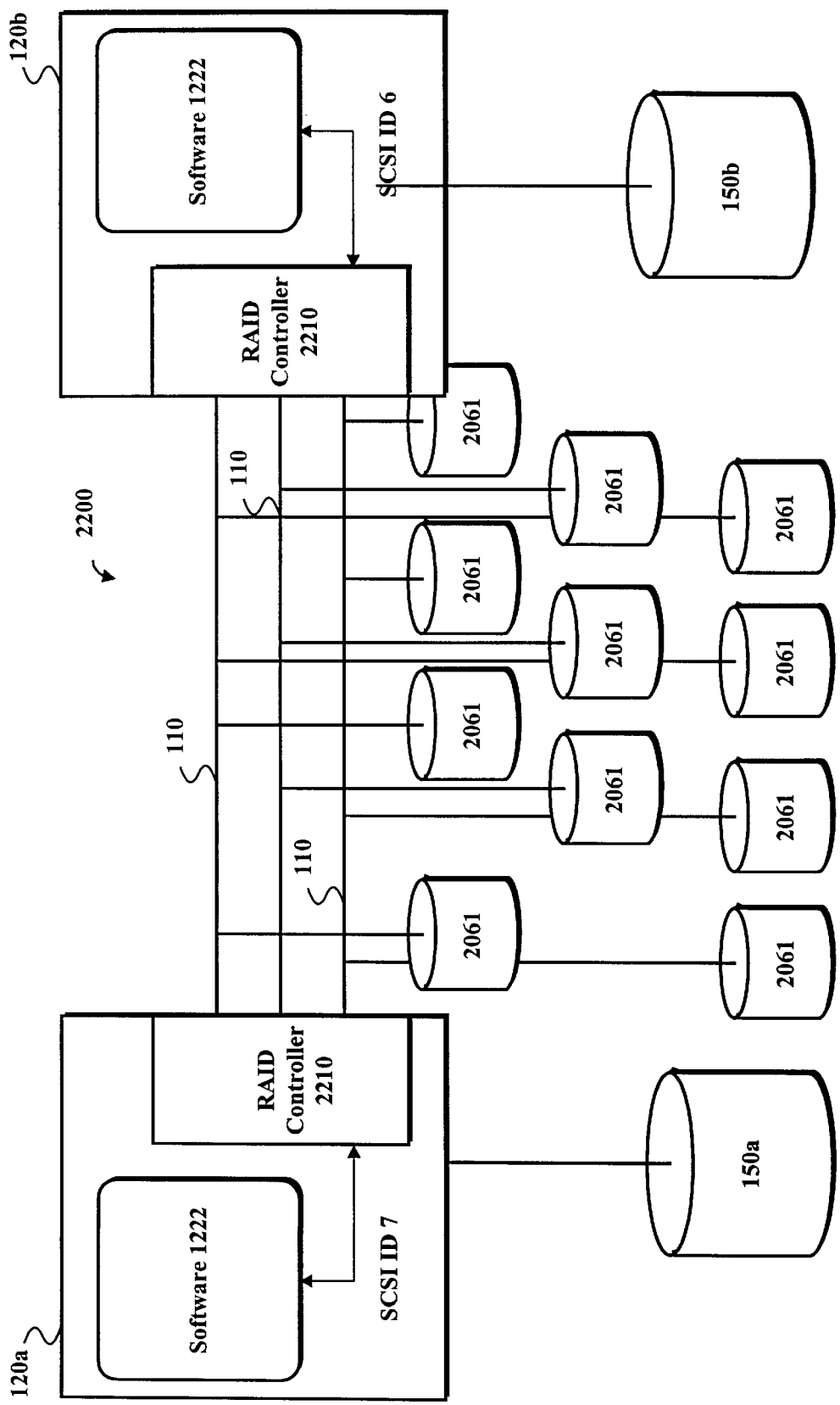
FIG. 22 illustrates the physical view of a third cluster system with internal RAID controllers and multiple shared SCSI channels, according to the prior art.
Figure 23:
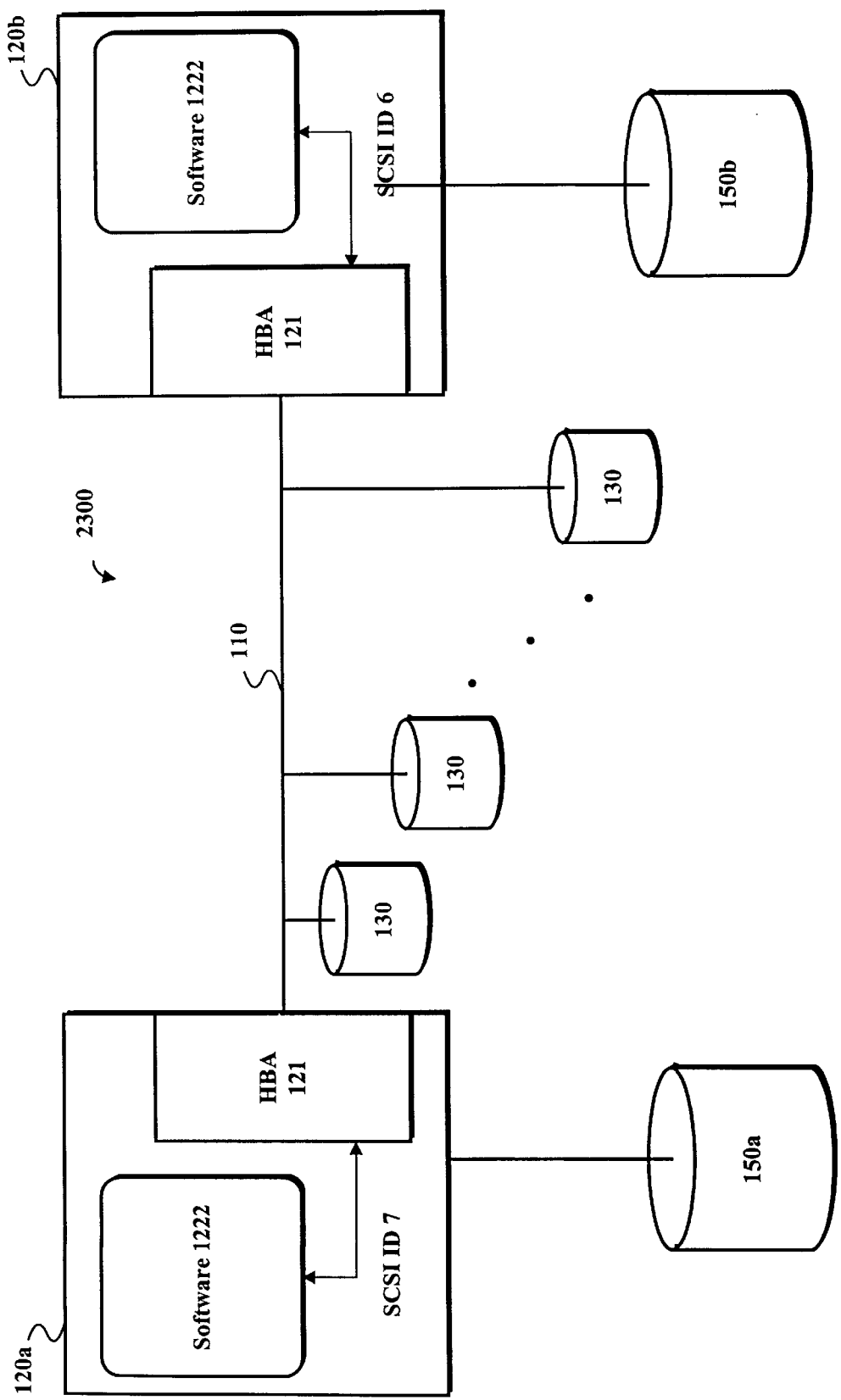
FIG. 23 illustrates the logical view of the cluster system of FIG. 22.

While the description above is in terms of SCSI-2 and a cluster system of two nodes, a routine practioner in the art will readily realize the invention's applications in a later SCSI environment, for example, SCSI-3 or in a cluster system having 3 or more nodes. Indeed, the invention now being fully described, many changes and modifications that can be made thereto without departing from the spirit or scope of the appended claims will be apparent to one of ordinary skill in the art. The application of the invention in an external-RAID-controller environment such as that of FIG. 20 and/or with a reservation table 390 as in Table 21 are examples.

This specification incorporates by reference all publications and patent applications mentioned herein, to the same extent if the specification had specifically and individually incorporated by reference each such individual publication or patent application.

TABLE 1

Reservation Table

| TARGET SCSI ID | RESERVING INITIATOR SCSI ID |
|---|---|
| 0 | 6 |
| 1 | (NONE) |
| ... | ... |
| 4 | 7 |

TABLE 2

20h-Opcode Vendor-Specific SCSI Command

| Bit Byte | 7 | 6 | 5 | 4 | 3 | 2 | 1 | 0 |
|---|---|---|---|---|---|---|---|---|
| 0 | | | | Opcode = 20h | | | | |
| 1 | | | | Vendor-Specific | | | | |
| 2 | | | | Vendor-Specific | | | | |
| 3 | | | | Vendor-Specific | | | | |
| 4 | | | | Vendor-Specific | | | | |
| 5 | | | | Vendor-Specific | | | | |
| 6 | | | | Vendor-Specific | | | | |
| 7 | | | | Vendor-Specific | | | | |
| 8 | | | | Vendor-Specific | | | | |
| 9 | | | | Control Byte | | | | |

TABLE 3

Node_Cable_Check( )

| Bit Byte | 7 | 6 | 5 | 4 | 3 | 2 | 1 | 0 |
|---|---|---|---|---|---|---|---|---|
| 0 | | | | Opcode = 20h | | | | |
| 1 | Logical Unit Number | | | | | Reserved | | |
| 2 | | | | DCMD Opcode - Node_Cable_Check | | | | |

TABLE 3-continued

Node_Cable_Check( )

| Bit Byte | 7 | 6 | 5 | 4 | 3 | 2 | 1 | 0 |
|---|---|---|---|---|---|---|---|---|
| 3 | | | | Reserved | | | | |
| 4 | | | | Reserved | | | | |
| 5 | | | | Reserved | | | | |
| 6 | | | | Reserved | | | | |
| 7 | | | | Reserved | | | | |
| 8 | | | | Reserved | | | | |
| 9 | | | | Control Byte | | | | |

TABLE 4

Node_Read( )

| Bit Byte | 7 | 6 | 5 | 4 | 3 | 2 | 1 | 0 |
|---|---|---|---|---|---|---|---|---|
| 0 | | | | Opcode = 20h | | | | |
| 1 | Logical Unit Number | | | | | Reserved | | |
| 2 | | | | DCMD Opcode - Node_Read | | | | |
| 3 | | | | | | | | LSB |
| 4 | | | | Physical Address | | | | |
| 5 | | | | | | | | |
| 6 | MSB | | | | | | | |
| 7 | | | | Count (LSB) | | | | |
| 8 | | | | Count (MSB) | | | | |
| 9 | | | | Control Byte | | | | |

TABLE 5

Node_Write( )

| Bit Byte | 7 | 6 | 5 | 4 | 3 | 2 | 1 | 0 |
|---|---|---|---|---|---|---|---|---|
| 0 | | | | Opcode = 20h | | | | |
| 1 | Logical Unit Number | | | | | Reserved | | |
| 2 | | | | DCMD Opcode - Node_Write | | | | |
| 3 | | | | | | | | LSB |
| 4 | | | | Physical Address | | | | |
| 5 | | | | | | | | |
| 6 | MSB | | | | | | | |
| 7 | | | | Count (LSB) | | | | |
| 8 | | | | Count (MSB) | | | | |
| 9 | | | | Control Byte | | | | |

TABLE 6

Node_Negotiate( )

| Bit Byte | 7 | 6 | 5 | 4 | 3 | 2 | 1 | 0 |
|---|---|---|---|---|---|---|---|---|
| 0 | | | | Opcode = 20h | | | | |
| 1 | Logical Unit Number | | | | | Reserved | | |
| 2 | | | | DCMD Opcode - Node_Negotiate | | | | |
| 3 | | | | Reserved | | | | |
| 4 | | | | Reserved | | | | |
| 5 | | | | Reserved | | | | |
| 6 | | | | Reserved | | | | |
| 7 | | | | Reserved | | | | |
| 8 | | | | Reserved | | | | |
| 9 | | | | Control Byte | | | | |

TABLE 7

Node__Kill( )

| Byte \ Bit | 7 | 6 | 5 | 4 | 3 | 2 | 1 | 0 |
|---|---|---|---|---|---|---|---|---|
| 0 | \multicolumn{8}{c}{Opcode = 20h} |||||||| 
| 1 | Logical Unit Number ||| Reserved |||||
| 2 | DCMD Opcode - Node__Kill ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Control Byte ||||||||

TABLE 8

Node__Reserve( )

| Byte \ Bit | 7 | 6 | 5 | 4 | 3 | 2 | 1 | 0 |
|---|---|---|---|---|---|---|---|---|
| 0 | Opcode = 20h ||||||||
| 1 | Logical Unit Number ||| Reserved |||||
| 2 | DCMD Opcode - Node__Reserve ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Control Byte ||||||||

TABLE 9

Node__Release( )

| Byte \ Bit | 7 | 6 | 5 | 4 | 3 | 2 | 1 | 0 |
|---|---|---|---|---|---|---|---|---|
| 0 | Opcode = 20h ||||||||
| 1 | Logical Unit Number ||| Reserved |||||
| 2 | DCMD Opcode - Node__Release ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Control Byte ||||||||

TABLE 10

Node__Inform__Rebuild__Received( )

| Byte \ Bit | 7 | 6 | 5 | 4 | 3 | 2 | 1 | 0 |
|---|---|---|---|---|---|---|---|---|
| 0 | Opcode = 20h ||||||||
| 1 | Logical Unit Number ||| Reserved |||||
| 2 | DCMD Opcode - Node__Inform__Rebuild__Received ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Control Byte ||||||||

TABLE 11

Node__Inform__Master__Rebuild__Received( )

| Byte \ Bit | 7 | 6 | 5 | 4 | 3 | 2 | 1 | 0 |
|---|---|---|---|---|---|---|---|---|
| 0 | Opcode = 20h ||||||||
| 1 | Logical Unit Number ||| Reserved |||||
| 2 | DCMD Opcode - Node__Inform__Master__Rebuild__Received ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Control Byte ||||||||

TABLE 12

Node__Rebuild( )

| Byte \ Bit | 7 | 6 | 5 | 4 | 3 | 2 | 1 | 0 |
|---|---|---|---|---|---|---|---|---|
| 0 | Opcode = 20h ||||||||
| 1 | Logical Unit Number ||| Reserved |||||
| 2 | DCMD Opcode - Node__Rebuild ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Control Byte ||||||||

TABLE 13

Node__Inform__Rebuild__Started( )

| Byte \ Bit | 7 | 6 | 5 | 4 | 3 | 2 | 1 | 0 |
|---|---|---|---|---|---|---|---|---|
| 0 | Opcode = 20h ||||||||
| 1 | Logical Unit Number ||| Reserved |||||
| 2 | DCMD Opcode - Node__Inform__Rebuild__Started ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Control Byte ||||||||

TABLE 14

Node__Inform__Status( )

| Byte \ Bit | 7 | 6 | 5 | 4 | 3 | 2 | 1 | 0 |
|---|---|---|---|---|---|---|---|---|
| 0 | Opcode = 20h ||||||||
| 1 | Logical Unit Number ||| Reserved |||||
| 2 | DCMD Opcode - Node__Inform__Status ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Control Byte ||||||||

TABLE 15

Node_Inform_Rebuild_Completed( )

| Byte | Bit 7 | 6 | 5 | 4 | 3 | 2 | 1 | 0 |
|---|---|---|---|---|---|---|---|---|
| 0 | | | | Opcode = 20h | | | | |
| 1 | Logical Unit Number | | | | Reserved | | | |
| 2 | DCMD Opcode - Node_Inform_Rebuild_Completed | | | | | | | |
| 3 | Reserved | | | | | | | |
| 4 | Reserved | | | | | | | |
| 5 | Reserved | | | | | | | |
| 6 | Reserved | | | | | | | |
| 7 | Reserved | | | | | | | |
| 8 | Reserved | | | | | | | |
| 9 | Control Byte | | | | | | | |

TABLE 16

Node_Inform_Rebuild_All( )

| Byte | Bit 7 | 6 | 5 | 4 | 3 | 2 | 1 | 0 |
|---|---|---|---|---|---|---|---|---|
| 0 | | | | Opcode = 20h | | | | |
| 1 | Logical Unit Number | | | | Reserved | | | |
| 2 | DCMD Opcode - Node_Inform_Rebuild_All | | | | | | | |

TABLE 16-continued

Node_Inform_Rebuild_All( )

| Byte | Bit 7 | 6 | 5 | 4 | 3 | 2 | 1 | 0 |
|---|---|---|---|---|---|---|---|---|
| 3 | Reserved | | | | | | | |
| 4 | Reserved | | | | | | | |
| 5 | Reserved | | | | | | | |
| 6 | Reserved | | | | | | | |
| 7 | Reserved | | | | | | | |
| 8 | Reserved | | | | | | | |
| 9 | Control Byte | | | | | | | |

TABLE 17

Heartbeat( )

| Byte | Bit 7 | 6 | 5 | 4 | 3 | 2 | 1 | 0 |
|---|---|---|---|---|---|---|---|---|
| 0 | | | | Opcode = 00h | | | | |
| 1 | Logical Unit Number | | | | Reserved | | | |
| 2 | Reserved | | | | | | | |
| 3 | Reserved | | | | | | | |
| 4 | Reserved | | | | | | | |
| 5 | Control Byte | | | | | | | |

TABLE 18

Inquiry( )

| Byte | Bit 7 | 6 | 5 | 4 | 3 | 2 | 1 | 0 |
|---|---|---|---|---|---|---|---|---|
| 0 | | | | Opcode = 12h | | | | |
| 1 | Logical Unit Number | | | Reserved | | | CmdDt | EVDP |
| 2 | Page Code | | | | | | | |
| 3 | Reserved | | | | | | | |
| 4 | Data Length | | | | | | | |
| 5 | Control Byte | | | | | | | |

TABLE 19

Standard SCSI Inquiry( ) Data

| Byte | Bit 7 | 6 | 5 | 4 | 3 | 2 | 1 | 0 |
|---|---|---|---|---|---|---|---|---|
| 0 | Peripheral Qualifier | | | | | Device Class | | |
| 1 | RMB | | | | Reserved | | | |
| 2 | ISO | | | ECMA | | | ANSI | |
| 3 | AEN | TIO (rmTsk) | Reserved (NACA) | Reserved | | Data Format | | |
| 4 | Additional Length | | | | | | | |
| 5 | Reserved | | | | | | | |
| 6 | Reserved | Reserved (Port) | Reserved (DualP) | Reserved (MChngr) | | Reserved (ARQ) | Reserved (Adr32) | Reserved (Adr16) |
| 7 | Rel | W32 | W16 | Sync | Link | Res. (TrnDis) | Que | SftR |
| 8–15 | Manufacturer | | | | | | | |
| 16–31 | Product | | | | | | | |
| 32–35 | Revision | | | | | | | |
| 36–55 | Vendor Unique | | | | | | | |
| 56–95 | Reserved | | | | | | | |
| 95– | Vendor Unique | | | | | | | |

TABLE 20

Vendor-Specific Inquiry( ) Data

| Field | Value |
|---|---|
| Peripheral Qualifier | 3 |
| Device Class | 0 |
| ISO | 02 |
| Data Format | 02 |
| Additional Length | 1Fh |
| Manufacturer | MYLEX |
| Product | DAC960 |
| Version | F/W Version |

TABLE 21

Alternate Reservation Table

| TARGET SCSI ID | LOGICAL UNIT ID | RESERVING INITIATOR SCSI ID |
|---|---|---|
| 0 | 0 | 6 |
|   | 1 | (NONE) |
|   | ... | ... |
|   | 7 | 7 |
| 1 | 0 | (NONE) |
|   | 1 | (NONE) |
|   | ... | ... |
|   | 7 | 7 |
| ... | ... | ... |
| 4 | 0 | (NONE) |
|   | 1 | (NONE) |
|   | ... | ... |
|   | 7 | (NONE) |

What is claimed is:

1. A method for re-configuring a computer system having multiple nodes, said method comprising:

communicatively coupling first and second nodes, having respective first and second channel controllers, by means of a channel and said first and second controllers;

detecting on said first node failure of node-to-node communications on said channel:

then testing by means of said first node a physical drive on said channel; and killing said first node by means of said first node if said testing was unsuccessful.

2. The method of claim 1, wherein said step of detecting comprises:

setting on said first node a limit for the number of successive failures of node-to-node communications; and attempting successive node-to-node communications said limited number of times, each of said attempts failing.

3. The method of claim 1, wherein said step of testing a physical drive comprises:

determining whether any physical drive is online on said channel; and setting a first physical drive online on said channel as said physical drive for testing.

4. The method of claim 3, wherein said step of coupling comprises:

communicatively coupling said first and second nodes by means of multiple channels and selecting one of said multiple channels for node-to-node communications;

and wherein said step of setting a first physical drive comprises testing node-to-node communications on another of said multiple channels if no physical drive is online on said channel and terminating said method for re-configuring; and otherwise, setting a first physical drive online on said channel as said physical drive for testing.

5. The method of claim 1, wherein said step of killing said first node comprises:

killing by means of said first node said second node if said testing was successful.

6. A method for re-configuring a computer system having multiple nodes, said method comprising:

communicatively coupling first and second nodes, having respective first and second channel controllers, by means of a channel and said first and second controllers;

detecting on said first node failure of node-to-node communications on said channel;

then testing by means of said first node a physical drive on said channel; and killing by means of said first node said second node if said testing was successful.

7. A method for re-configuring a computer system having multiple nodes, said method comprising:

communicatively coupling said first and second nodes, having respective first and second channel controllers, by means of multiple channels and selecting one of said multiple channels for node-to-node communications;

setting on said first node a limit for the number of successive failures of node-to-node communications;

attempting successive node-to-node communications said limited number of times, each of said attempts failing;

detecting on said first node said limited number of failed successive attempts at node-to-node communications on said channel;

then determining whether any physical drive is online on said channel; and testing node-to-node communications on another of said multiple channels if no physical drive is online on said channel and terminating said method for re-configuring;

otherwise, setting a first physical drive online on said channel as said physical drive for testing if a physical drive is online on said channel;

then setting a first physical drive online on said channel as said physical drive for testing;

then testing by means of said first node a physical drive on said channel;

killing by means of said first node said second node if said testing was successful; and killing said first node by means of said first node if said testing was unsuccessful.

8. A computer-readable medium for data storage wherein is located a computer program for causing a computer system having multiple nodes, having respective first and second channel controllers and communicatively coupled by means of a channel and said first and second controllers, to re-configure by detecting on a first node of multiple nodes failure of node-to-node communications on a channel communicatively coupling first and second nodes;

then testing by means of said first node a physical drive on said channel;

killing by means of said first node said second node if said testing was successful; and killing said first node by means of said first node if said testing was unsuccessful.

9. A computer-readable medium for data storage wherein is located a computer program for causing a computer system having multiple nodes, having respective first and second channel controllers and communicatively coupled by means of multiple channels and said first and second controllers, to re-configure by selecting for node-to-node communications one of multiple channels communicatively coupling first and second nodes;

setting on said first node a limit for the number of successive failures of node-to-node communications;

attempting successive node-to-node communications said limited number of times, each of said attempts failing;

detecting on said first node said limited number of failed successive attempts at node-to-node communications on said channel;

then determining whether any physical drive is online on said channel; and testing node-to-node communications on another of said multiple channels if no physical drive is online on said channel and terminating said method for re-configuring;

otherwise, setting a first physical drive online on said channel as said physical drive for testing if a physical drive is online on said channel;

then setting a first physical drive online on said channel as said physical drive for testing;

then testing by means of said first node a physical drive on said channel;

killing by means of said first node said second node if said testing was successful; and killing said first node by means of said first node if said testing was unsuccessful.

10. A computer system comprising:

the computer-readable medium of claim 8;

a CPU for executing said computer program in said medium; and a bus communicatively coupling said medium and said CPU.

11. A computer system comprising:

the computer-readable medium of claim 9;

a CPU for executing said computer program in said medium; and a bus communicatively coupling said medium and said CPU.

12. A cluster computer system comprising:

a first and second instances of said computer system of claim 10; and a channel communicatively coupling said first and second instances.

13. A cluster computer system comprising:

a first and second instances of said computer system of claim 11; and a channel communicatively coupling said first and second instances.

14. A method for re-configuring a computer system having multiple nodes, said method comprising:

communicatively coupling first and second nodes, having respective first and second channel controllers, by means of multiple channels and said first and second controllers, thus forming a computer system;

receiving on said first node a command to negotiate a configuration for said computer system;

testing by means of said first node a physical drive on one of said multiple channels in response to said receiving;

negotiating by means of said first node if said testing was successful; and killing said first node by means of said first node if said testing was unsuccessful.

15. The method of claim 14, wherein said step of testing comprises;

checking each one of said multiple channels either (1) until said each channel passes said checking, in which case said first node negotiates in response to said negotiate command and terminates said method for re-configuring, or (2) until one of said multiple channels fails said checking and has a physical drive online, in which case said first node sets a first physical drive online on said channel as said physical drive for testing.

16. A computer-readable medium for data storage wherein is located a computer program for causing a computer system having multiple nodes, having respective first and second channel controllers and communicatively coupled by means of multiple channels and said first and second controllers, to re-configure by receiving on a first of multiple nodes forming a computer system a command to negotiate a configuration for said computer system;

testing by means of said first node a physical drive on one of said multiple channels in response to said receiving;

negotiating by means of said first node if said testing was successful; and killing said first node by means of said first node if said testing was unsuccessful.

17. The computer-readable medium of claim 16, wherein said step of testing comprises checking each one of said multiple channels either (1) until said each channel passes said checking, in which case said first node negotiates in response to said negotiate command and terminates said method for re-configuring, or (2) until one of said multiple channels fails said checking and has a physical drive online, in which case said first node sets a first physical drive online on said channel as said physical drive for testing.

18. a computer system comprising:

the computer-readable medium of claim 16; and a CPU for executing said computer program in said medium; and a bus communicatively coupling said medium and said CPU.

19. a cluster computer system comprising:

a first and second instances of said computer system of claim 18; and a channel communicatively coupling said first and second instances.

20. A computer-readable medium for data storage wherein is located a computer program for causing a computer system having multiple nodes, having respective first and second channel controllers and communicatively coupled by means of a channel and the first and second controllers, to re-configure by detecting on a first of the multiple nodes failure of node-to-node communications on the channel communicatively coupling the first and a second of the multiple nodes;

then testing by means of the first node a physical drive on the channel; and killing the first node by means of the first node if the testing was unsuccessful, wherein the step of detecting comprises:

setting on the first node a limit for the number of successive failures of node-to-node communications; and attempting successive node-to-node communications the limited number of times, each of the attempts failing.

21. A computer system comprising:

the computer-readable medium of claim 20;

a CPU for executing the computer program in the medium; and a bus communicatively coupling the medium and the CPU.

22. A cluster computer system comprising:

first and second instances of the computer system of claim 21; and a channel communicatively coupling the first and second instances.

23. A computer system comprising:

the computer-readable medium of claim 17;

a CPU for executing the computer program in the medium; and a bus communicatively coupling the medium and the CPU.

24. A cluster computer system comprising:

first and second instances of the computer system of claim 23; and a channel communicatively coupling the first and second instances.

* * * * *